(12) United States Patent
Peng

(10) Patent No.: US 11,667,744 B2
(45) Date of Patent: Jun. 6, 2023

(54) BLOCK COPOLYMER STRUCTURE AND THE PREPARING METHOD THEREOF

(71) Applicant: National Tsing Hua University, Hsinchu (TW)

(72) Inventor: Chi-How Peng, Hsinchu (TW)

(73) Assignee: NATIONAL TSING HUA UNIVERSITY, Hsinchu (TW)

( * ) Notice: Subject to any disclaimer, the term of this patent is extended or adjusted under 35 U.S.C. 154(b) by 0 days.

(21) Appl. No.: 17/693,898

(22) Filed: Mar. 14, 2022

(65) Prior Publication Data

US 2022/0195100 A1   Jun. 23, 2022

Related U.S. Application Data

(62) Division of application No. 17/034,144, filed on Sep. 28, 2020, now Pat. No. 11,326,013.

(30) Foreign Application Priority Data

Jul. 2, 2020   (TW) .................................. 109122419

(51) Int. Cl.
  *C08F 8/12*        (2006.01)
  *C08F 293/00*      (2006.01)

(52) U.S. Cl.
  CPC ............ C08F 293/005 (2013.01); C08F 8/12 (2013.01)

(58) Field of Classification Search
  CPC ..................... C08F 293/005; C08F 2438/03
  See application file for complete search history.

(56) References Cited

U.S. PATENT DOCUMENTS

2010/0160574 A1   6/2010   Perrier
2016/0304678 A1   10/2016  Moravek et al.

FOREIGN PATENT DOCUMENTS

CN   101605827 A   8/2012
EP   3109064 A1    8/2015
(Continued)

OTHER PUBLICATIONS

Shin-Ji Chen, Shan-Chang Tang, Pan Zhang, Changle Chen, and Chi-How Peng, Aluminan Tralen Complex Meditated Reversible-Deactivation Radial Polymerization of Vinyl Acetate, ACS Macro Letters, vol. 9, No. 10, Sep. 15, 2020, pp. 1423-1428, XP055782431, ISSN:2161-1653.

*Primary Examiner* — Mark S Kaucher
(74) *Attorney, Agent, or Firm* — Muncy, Geissler, Olds & Lowe, P.C.

(57) ABSTRACT

A block copolymer having the general formula as formula (1): mediator-$P_2$-$P_1$-X, formula (1), and the chemical structural formula is

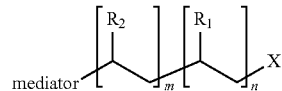

formula (2), in which the mediator in formula (1) and formula (2) is a regulator, which is a conjugated seven-membered ring structure, $P_1$ is a first polymer which may be a conjugated or non-conjugated olefin monomer, $R_1$ is the functional group of $P_1$, n is the number of the monomer of $P_1$, which is a positive integer and the range is 10~1,500. $P_2$ is a second polymer, m is the number of the monomer of $P_2$, (Continued)

which is a positive integer and the range is 10~1,500, and X is the end-functional group of the block copolymer.

10 Claims, 20 Drawing Sheets

(56) References Cited

FOREIGN PATENT DOCUMENTS

| EP | 3109064 B1 * | 11/2018 | ........... B29B 7/7495 |
|----|---|---|---|
| WO | 00/11055 | 3/2000 | |
| WO | 2005/061555 A1 | 7/2005 | |
| WO | 2015/113114 A1 | 8/2015 | |

* cited by examiner

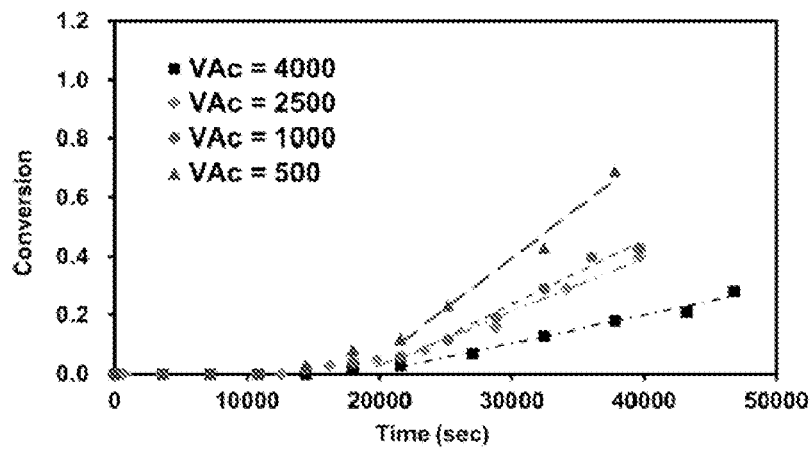
Fig. 3A
Replacement Sheet

BLOCK COPOLYMER STRUCTURE AND THE PREPARING METHOD THEREOF

CROSS-REFERENCE TO RELATED APPLICATIONS

This application claims the benefit of TW Application No. 109122419, filed on Jul. 2, 2020, and this application is a divisional of U.S. application Ser. No. 17/034,144, filed on Sep. 28, 2020, the content of which are hereby incorporated by reference in their entirety.

FIELD OF THE INVENTION

The invention relates to the field of polymer synthesis technology, especially in a synthetic method for producing block copolymer without metal-containing catalyst.

BACKGROUND OF THE INVENTION

Poly(vinyl acetate) (PVAc) is a category of engineering polymers, which has been widely applied in the fields such as adhesives, painting, and construction materials. In the commercially available product, however; the performance of PVAc materials is limited by broad molecular weight distribution that leads to higher polydispersity (PDI). Reversible addition-fragmentation chain transfer (RAFT), one of the crucial reversible-deactivation radical polymerization (RDRP), has gained tremendous achievement in recent two decades. Operational environment at mild condition and broad monomer scopes have made RAFT a versatile technique used in the synthesis of block, graft, hyper-branched and star-like polymer, etc. It should be noted that the control agent, entitled as a chain transfer agent (CIA), plays an important role in RAFT technique, where both activation and deactivation groups are highly associated with the kinetics of polymerization. Cumyl dithiobenzoate (CDB) and 1-phenylethyl dithiobenzoate (PEDB) are the commonly used CIA for RAFT polymerization, which show better control in the polymerization of styrene and (math) acrylates but are limited to other categories of common monomers such as vinyl acetate.

Poly(vinyl alcohol) (PVA) is an industrial polymer used in painting, contact lens, polarizer, and hydrogel, etc., which has shown high-volume demand and used in value-added products. However, control agent containing sulfur or heavy metal that is used to facilitate the synthesis of PVA block copolymer not only shows biological toxicity but also the risk of environmental pollution. Besides, unaffordable price somehow restricted the application of PVA block copolymer.

SUMMARY OF THE INVENTION

According to the drawback of prior art, the main purpose of invention is developing a mediator to control the block copolymerization. Because the control mediator contains elements including only carbon, hydrogen, oxygen, and nitrogen, it does not cause the issues of toxicity and environmental pollution during the block copolymerization.

Another object of the present invention is to synthesize block copolymer with narrow molecular-weight distribution mediated by conjugated seven-membered ring organic compound.

According to the abovementioned purpose, the invention reveals a kind of block copolymer, which has the general formula:

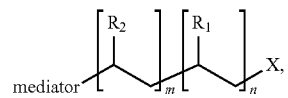

mediator-$P_2$-$P_1$-X, formula (1) and its chemical formula formula (2). In formula (1): $P_1$ is a first polymer, $P_2$ is a second polymer, is the functional group of the first polymer, $R_2$ is the functional group of the second polymer, and X is the end-functional group of block copolymer. The X can be

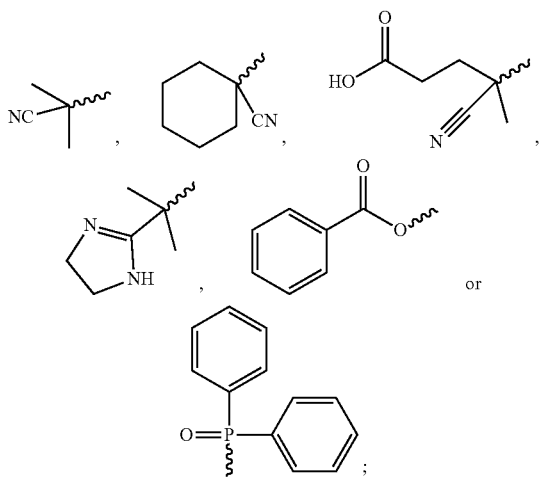

n and m of positive integers are the degree of polymerization (DP) of the first polymer and the second polymer, ranging from 10 to 1,500, whether they would be the same or different.

The embodiments in the invention show that conjugated seven-membered ring organic compound as the mediator gives the better control of polymerization, the chemical formula are drawing as below:

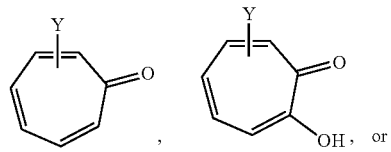

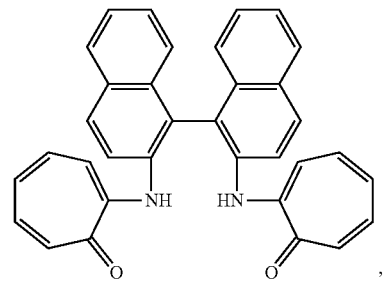

where Y=halide, H, OR, $NR_2$, alkyl($C_1$~$C_{20}$), cycloalkanes, aromatic ring or arene; R=H, alkyl($C_1$~$C_{20}$), cycloalkanes, aromatic ring or arene.

The mediator also can be

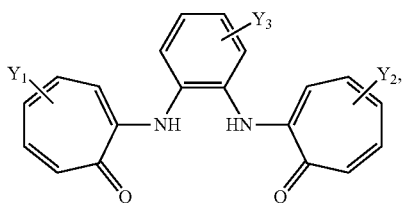

where $Y_1$, $Y_2$ and $Y_3$=halide, H, OR, $NR_2$, alkyl($C_1$~$C_{20}$), cycloalkanes, aromatic ring or arene and $Y_1$, $Y_2$ and $Y_3$ can be the same or different. R=H, alkyl($C_1$~$C_{20}$) cycloalkanes, aromatic ring or arene.

The embodiments in the invention show that the first polymer and the second polymer can be a conjugated or non-conjugated alkene monomer.

The embodiments in the invention show that the monomer of the first polymer and the second polymer can be

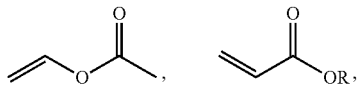

where R=alkyl ($C_1$~$C_{10}$),

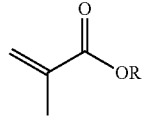

where R=alkyl ($C_1$~$C_{10}$),

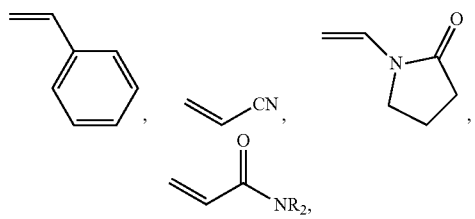

where R=methyl, ethyl, propyl or isopropyl,

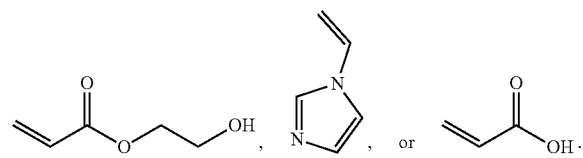

According to aforementioned purpose, the invention reveals a preparing method thereof of block copolymer. The synthetic process included: mixing molar ratio of 1,000/20/1 of unhydrolyzed monomers, radical initiator, and mediator, respectively, for the preparation of first unhydrolyzed polymer ($P_1'$). The structure of first intermediate ($P_1'$) can be shown as mediator-$P_1'$-X, formula (3), where X is the end-functional group of first polymer; mixing the first intermediate and unhydrolyzed monomer of second polymer ($P_2'$) can form the second intermediate ($P_2'$), where the structure of second intermediate is mediator-$P_2'$-$P_1'$-X, formula (4), the second discrete polymer can be hydrolyzed or not, X is the end-functional group of second intermediate; generating the block copolymer by the hydrolysis of the second intermediate (mediator-$P_2'$-$P_1'$-X), the formula can be described as mediator-$P_2'$-$P_1$-X, formula (5) or mediator-$P_2$-$P_1$-X, formula (6), the structure can be shown as

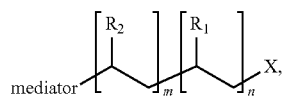

formula (7). $P_2'$ in formula (5) is indicated as a second polymer ($P_2'$) that had not been hydrolyzed after the hydrolytic process of unhydrolyzed second polymer ($P_2'$). $P_2$ in formula (6) is represented as a second polymer $P_2$ after the hydrolysis of unhydrolyzed second polymer $P_2'$. In formula (7), $R_1$ is the functional group of first polymer ($P_1$), and n is the repeating unit of monomer of first polymer, a positive integer; $R_2$ is the functional group of second polymer ($P_2$ or $P_2'$), and m is the repeating unit of monomer of second polymer, a positive integer. n, m are within 10~1,500. The end-functional group (X) of block copolymer can be

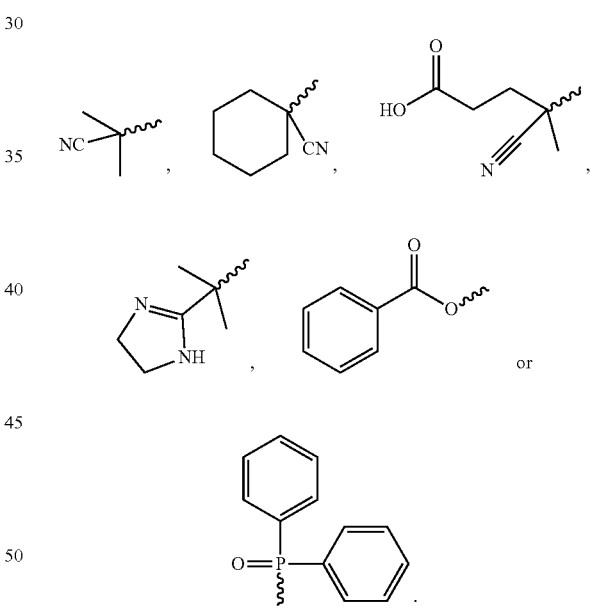

Besides, the end-functional group (X) of first intermediate (shown as formula (3)), second intermediate (shown as formula (4)) and block copolymer (shown as formula (5)~formula (7)) is the same. The average molecular weight of block copolymer lays between 2,000~120,000, the better one is within 1,000~200,000.

The embodiments in the invention show that the preparation of block copolymer can be conducted with or without additional radical initiator in the case of mixing the first intermediate and the monomer of second polymer.

Either aqueous or organic initiators could be a radical initiator to prepare block copolymer in the embodiments in the invention.

The embodiments in the invention show that the better aqueous initiator to prepare block copolymer can be

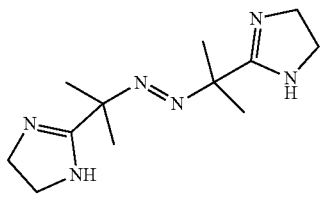 [SMILES: CC(C)(/N=N/C(C)(C)C1=NCCN1)C1=NCCN1]

(2,2'-Azobis[2-(2-imidazolin-2-yl)propane]dihydrochloride), or

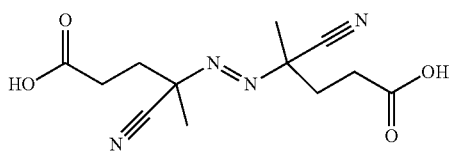 [SMILES: CC(C#N)(CCC(=O)O)/N=N/C(C)(C#N)CCC(=O)O]

(4,4'-Azobis(4-cyanopentanoic acid)).

The embodiments in the invention show that the better organic initiator to prepare block copolymer can be

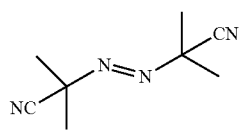

(2,2'-Azobis(2-methylpropionitrile), AIBN),

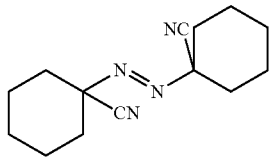 [SMILES: N#CC1(/N=N/C2(C#N)CCCCC2)CCCCC1]

(1,1'-Azobis(cyanocyclohexane, ABCN),

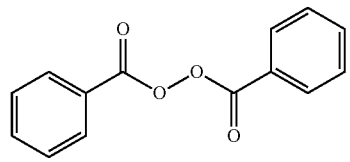 [SMILES: O=C(OOC(=O)c1ccccc1)c1ccccc1]

(diphenylperoxyanhydride, BPO), or

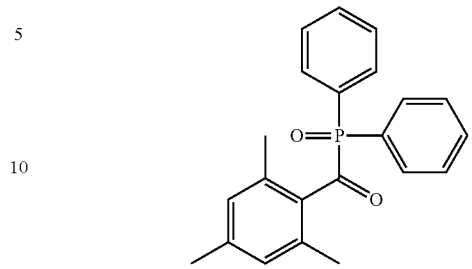

(diphenyl(2,4,6-trimethylbenzoyl)phosphine oxide, TPO).

The embodiments in the invention show that the better molar ratio of radical initiator to mediator to prepare block copolymer is from 0.5 to 50.

The embodiments in the invention show that the monomer of first polymer and second polymer can be a conjugated or non-conjugated alkene monomer.

The embodiments in the invention show that the monomer of first polymer and the second polymer can be

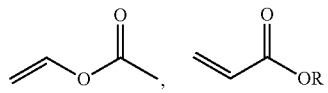

where R=alkyl ($C_1$~$C_{10}$),

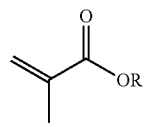

where R=alkyl($C_1$~$C_{10}$),

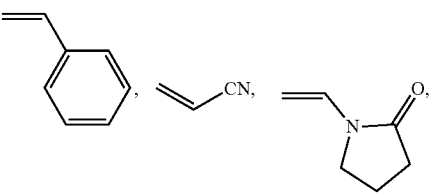

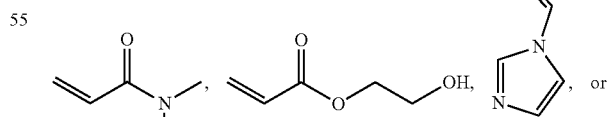

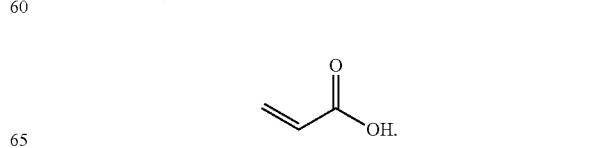

The embodiments in the invention show that the better condition is to use conjugated seven-membered ring organic compound as the mediator, the chemical formula are drawn below:

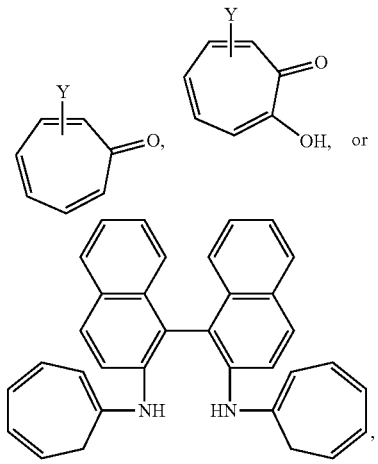

where Y=halide, H, OR, $NR_2$, alkyl($C_1$~$C_{20}$), cycloalkanes, aromatic ring or arene. R=H, alkyl($C_1$~$C_{20}$), cycloalkanes, aromatic ring or arene.

The mediator also can be

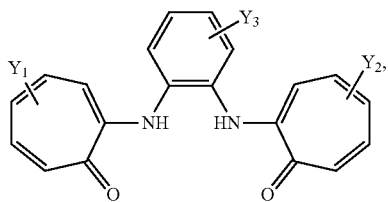

where $Y_1$, $Y_2$ and $Y_3$=halide, H, OR, $NR_2$, alkyl($C_1$~$C_{20}$), cycloalkanes, aromatic ring or arene and $Y_1$, $Y_2$ and $Y_3$ can be the same or different. R=H, alkyl($C_1$~$C_{20}$), cycloalkanes, aromatic ring or arene.

BRIEF DESCRIPTION OF THE DRAWINGS

FIG. 3A shows the relation of the monomer conversion versus time in the formation of first intermediate by using Tralen as the mediator with different equivalent of monomer, where the monomer of first polymer is vinyl acetate (VAc) in accordance with the present invention.

DETAILED DESCRIPTION OF THE PREFERRED EMBODIMENT

Figure 1:
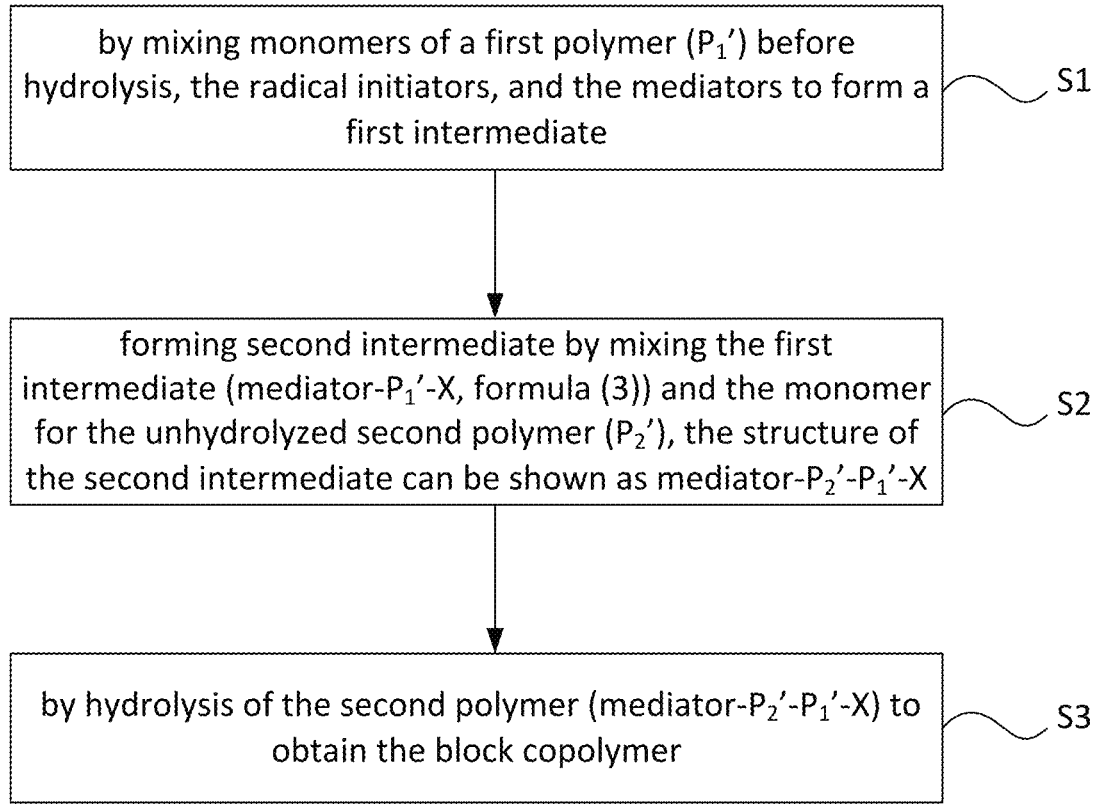
FIG. 1 shows the schematic of the preparing method of block copolymer in accordance with the present invention.

In this invention, by using carbon, hydrogen, oxygen and nitrogen containing conjugated seven-membered ring compound as a mediator for the polymerization of olefin monomers to form the block copolymers, especially in polyvinyl alcohol)-based block polymer. The general formula of block copolymer as formula (1): mediator-$P_2$-$P_1$-X, formula (1), the structure is shown as

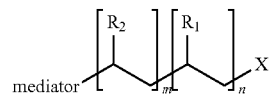

formula (2), wherein $P_1$ is the first polymer, $P_2$ is the second polymer, X is the end functional group of block copolymer, which can be

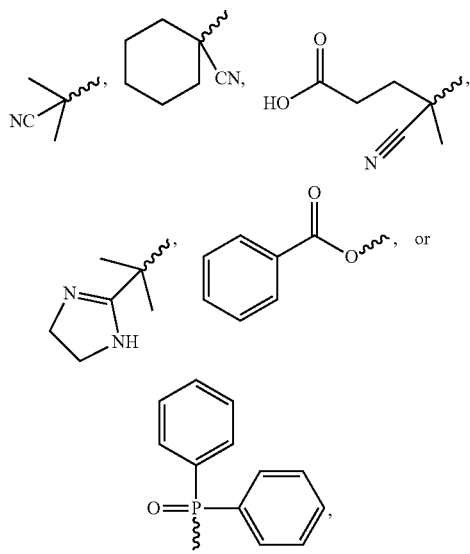

including but not limited to the structure above; R is the functional group of first polymer ($P_1$), n, an integer, is the degree of polymerization (DP) of first polymer ($P_1$), $R_2$ is the functional group of second polymer ($P_2$), m is the degree of polymerization (DP) of second polymer ($P_2$), belongs to an integer. In the embodiment of this invention, first polymer ($P_1$) and second polymer ($P_2$) can be the same or different.

In this embodiment, the end-functional group (X) of block copolymer abovementioned is generated from radical initiator by heat, light, or sonicate etc. The induce method of radical initiators are listed in Table 1:

TABLE 1

| Radical Initiator | Induce Method | $X_{(End\text{-}functional\ Group)}$ |
|---|---|---|
| 2,2'-Azobis (2-methylpropionitrile), AIBN | Heat | |
| 1,1'-Azobis (cyanocyclohexane), ABCN | Heat | |

TABLE 1-continued

| Radical Initiator | Induce Method | X(End-functional Group) |
| --- | --- | --- |
| 4,4'-Azobis (4-cyanopentanoic acid) | Heat | 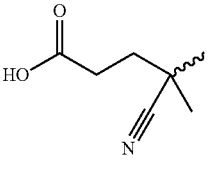 |
| 2,2'-Azobis[2-(2-imidazolin-2-yl)propane] dihydrochloride, VA-044 | Heat | 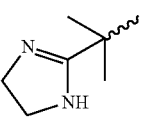 |
| Diphenylperoxyanhydride, BPO | Heat | 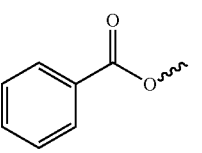 |
| Diphenyl (2,4,6-trimethylbenzoyl) phosphine oxide, TPO | Light | 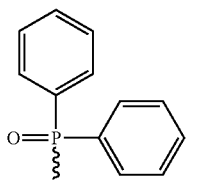 |

The embodiment in this invention, mediator has a conjugated, seven-membered ring structure, the structure can be described as below:

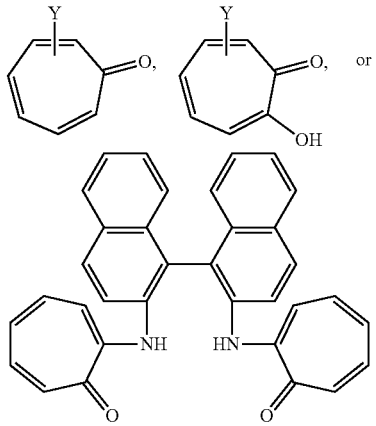

(Binam-Tralen), where Y can be halide, hydrogen, OR, $NR_2$, alkyl($C_1$~$C_{20}$), cycloalkane, aromatic ring or arene; R can be hydrogen, alkyl($C_1$~$C_{20}$), cycloalkane, aromatic ring or arene. In other embodiment, the mediator can be

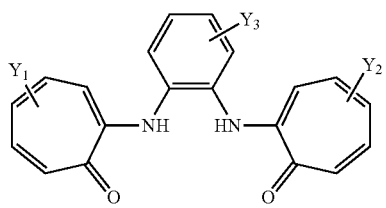

(Tralen), where $Y_1$, $Y_2$ and $Y_3$ can be halide, hydrogen, OR, $NR_2$, alkyl($C_1$~$C_{20}$), cycloalkane, aromatic ring or arene; R can be hydrogen, alkyl($C_1$~$C_{20}$), cycloalkane, aromatic ring or arene, where $Y_1$, $Y_2$ and $Y_3$ can be the same or different. As mentioned above, the mediator only contained carbon, hydrogen, oxygen or nitrogen element etc., which means that it does not cause issues of toxicity and environmental pollution during the polymerization process.

In this invention, the monomer of the first and second polymer is the conjugated or non-conjugated alkene, where the monomer of first and second polymer can be

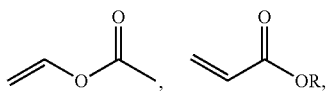

where R=alkyl($C_1$~$C_{10}$),

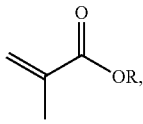

where R=alkyl($C_1$~$C_{10}$),

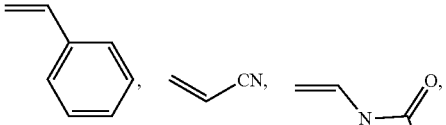

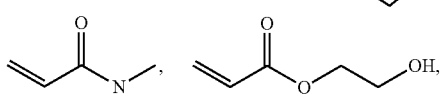

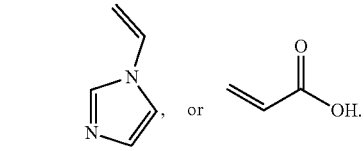

In this invention, the monomer of first and second polymer can be the same or different. In general, first polymer can be poly(vinyl acetate) or poly(vinyl alcohol), the second polymer can be polystyrene, poly(methyl acrylate), poly(methyl methacrylate), poly(vinylidene fluoride), polycaprolactone, polyglycolide, polyepichlorohydrin, poly(vinyl pyrrolidone), poly(vinyl chloride), polyethylene glycol), polyacrylonitrile, poly(N,N-dimethyl acrylamide), or poly(acrylic acid) which includes but not limited to the abovementioned categories.

According to the abovementioned information, the preparation of block copolymers is shown as FIG. 1. In FIG. 1, Step S1: by mixing the monomer of first polymer ($P_1'$) before hydrolysis, the radical initiator, and the mediator to form the first intermediate, wherein the structure of the first intermediate is mediator-$P_1'$-X, formula (3), where X is the end-functional group of first polymer. In this step, the molar ratio of the monomer of first polymer ($P_1'$) before hydrolysis, the radical initiator, and the mediator is 1:20:1,000. The better condition of the molar ratio between the radical initiator and the mediator can be 0.5~50, and the molar ratio between the monomer of first polymer ($P_1'$) before hydrolysis and the mediator are between 10~3,000. Besides, radical initiator can be either aqueous initiator or organic initiator, where the aqueous radical initiator can be

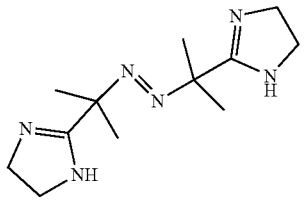 [SMILES: CC(C)(/N=N/C(C)(C)C1=NCCN1)C1=NCCN1]

(2,2'-azobis[2-(2-imidazolin-2-yl)propane]dihydrochloride) or

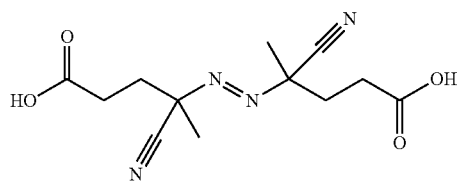 [SMILES: CC(C#N)(CCC(=O)O)/N=N/C(C)(C#N)CCC(=O)O]

(4,4'-azobis(4-cyanopentanoic acid)); organic radical initiator can be

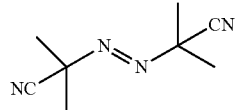

(azobisisobutyronitrile, AIBN),

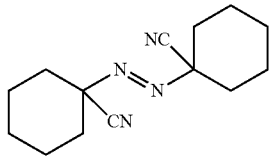 [SMILES: N#CC1(/N=N/C2(C#N)CCCCC2)CCCCC1]

(1,1'-azobis(cyanocyclohexane), ABCN),

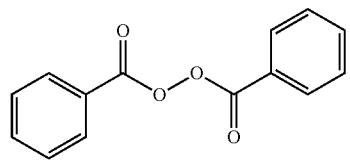 [SMILES: O=C(OOC(=O)c1ccccc1)c1ccccc1]

(diphenylperoxyanhydride, BPO), or

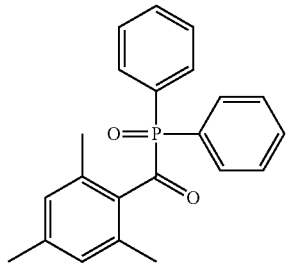 [SMILES: Cc1cc(C)c(C(=O)P(=O)(c2ccccc2)c2ccccc2)c(C)c1]

(diphenyl(2,4,6-trimethylbenzoyl)phosphine oxide, TPO).

AIBN is the initiator for this invention because AIBN has been widely used in the polymerization of olefin monomer and other radical reactions. The olefin monomer can be vinyl acetate, acrylates, acrylonitrile, or vinyl chloride. The advantage of using AIBN as the radical initiator is that the decomposition temperature is in the range of 65° C.~85° C., thus, AIBN can be applied in most of the polymerizations. Also, the dissociation rate of AIBN is steady in various solvents.

Then the Step S2: forming second intermediate by mixing the first intermediate (mediator-formula (3)) and the monomer of the unhydrolyzed second polymer ($P_2'$), the structure of the second intermediate can be shown as mediator-$P_2'$-$P_1'$-X, formula (4), where X is the end-functional group of second polymer. In this step, radical initiator can be added or not. Last, in Step S3: we can obtain the block copolymer by hydrolysis of the second intermediate (mediator-$P_2'$-$P_1'$-X, formula (4)). However, it is possible that the second polymer ($P_2'$) cannot be hydrolyzed. If the second polymer ($P_2'$) is not hydrolysable, the second intermediate (mediator-$P_2'$-$P_1'$-X) turns to mediator-$P_2'$-$P_1$-X, formula (5), after hydrolysis. If the second polymer ($P_2'$) is hydrolysable, the second intermediate (mediator-$P_2'$-$P_1'$-X) turns to mediator-$P_2$-$P_1$-X, formula (6), after hydrolysis, where $P_2$ means the hydrolyzed product of second polymer in formula (6). The general structure of final block copolymer, regardless of the hydrolysis, can be shown as

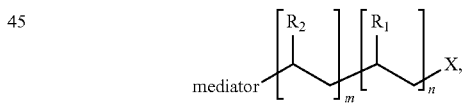

formula (7). The end-functional group (X) of first intermediate (shown as formula (3), second intermediate (shown as formula (4)), and block copolymer (shown as formula (5~formula (7)) is the same, which can be

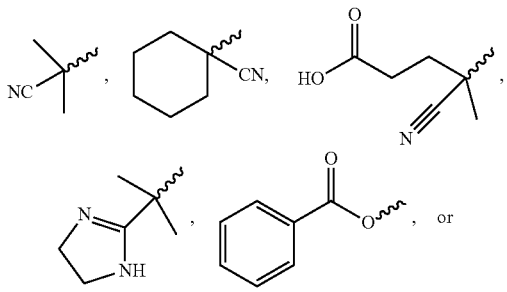

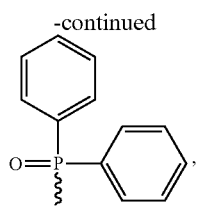

including but not limited to the above. The method of generating the end-functional group (X) has already been described in the previous paragraph; $R_1$ is the functional group of first polymer ($P_1$), $R_2$ is the functional group of second polymer ($P_2$ or $P_2$'). n is the amount of monomer of first polymer, which is an integer; m is the amount of monomer of second polymer; which is an integer. In this invention, first polymer ($P_1$) and second polymer ($P_2$) can be the same or different.

The description below is for the production of the block copolymer according to the method mentioned above.

Embodiment 1

Mediator: radical initiator: the monomer of first polymer (VAc), where the mediator is

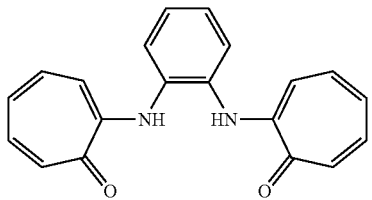 [SMILES: O=c1cccccc1Nc1ccccc1Nc1cccccc1=O]

(Tralen), radical initiator (X) is AIBN. With the molar ratio of mediator (Tralen), radical initiator (AIBN), and monomer of first polymer (VAc) equal to 1:X:1,000 and the reaction temperature of 60° C. in bulk condition, PVAc can be generated (first intermediate (mediator-$P_1$'-X), which has been described as Step S1). The reaction can be described as below:

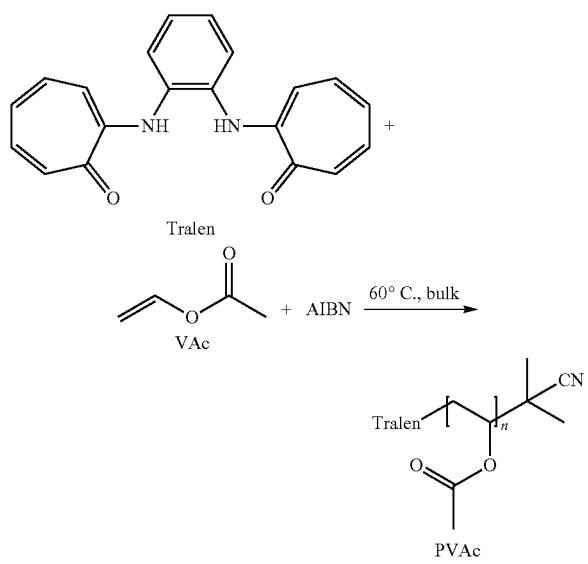

Figure 2A:
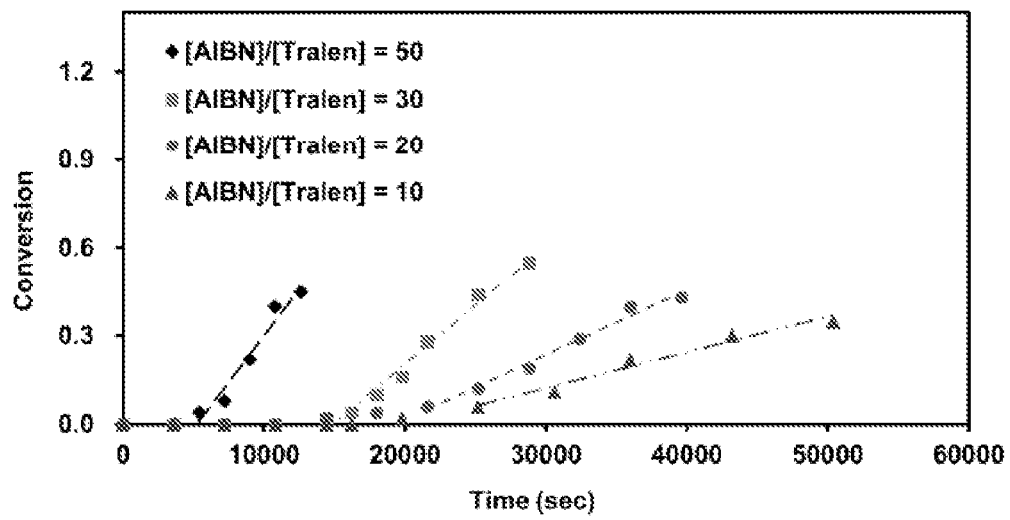
FIG. 2A shows the relation of monomer conversion versus time in the formation of first intermediate by using Tralen as the mediator in accordance with the present invention.
Figure 2B:
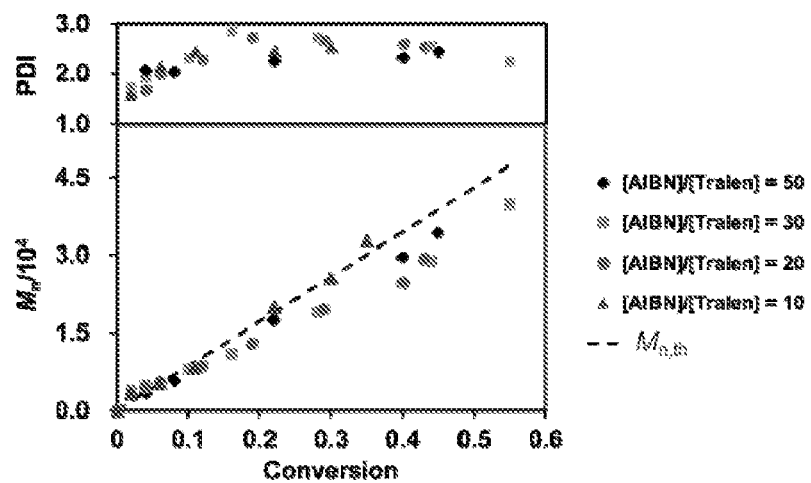
FIG. 2B shows the relation of the average molecular weight ($M_n$) and polymer dispersity index (PDI) versus monomer conversion in the formation of first intermediate by using Tralen as the mediator in accordance with the present invention.
Figure 2C:
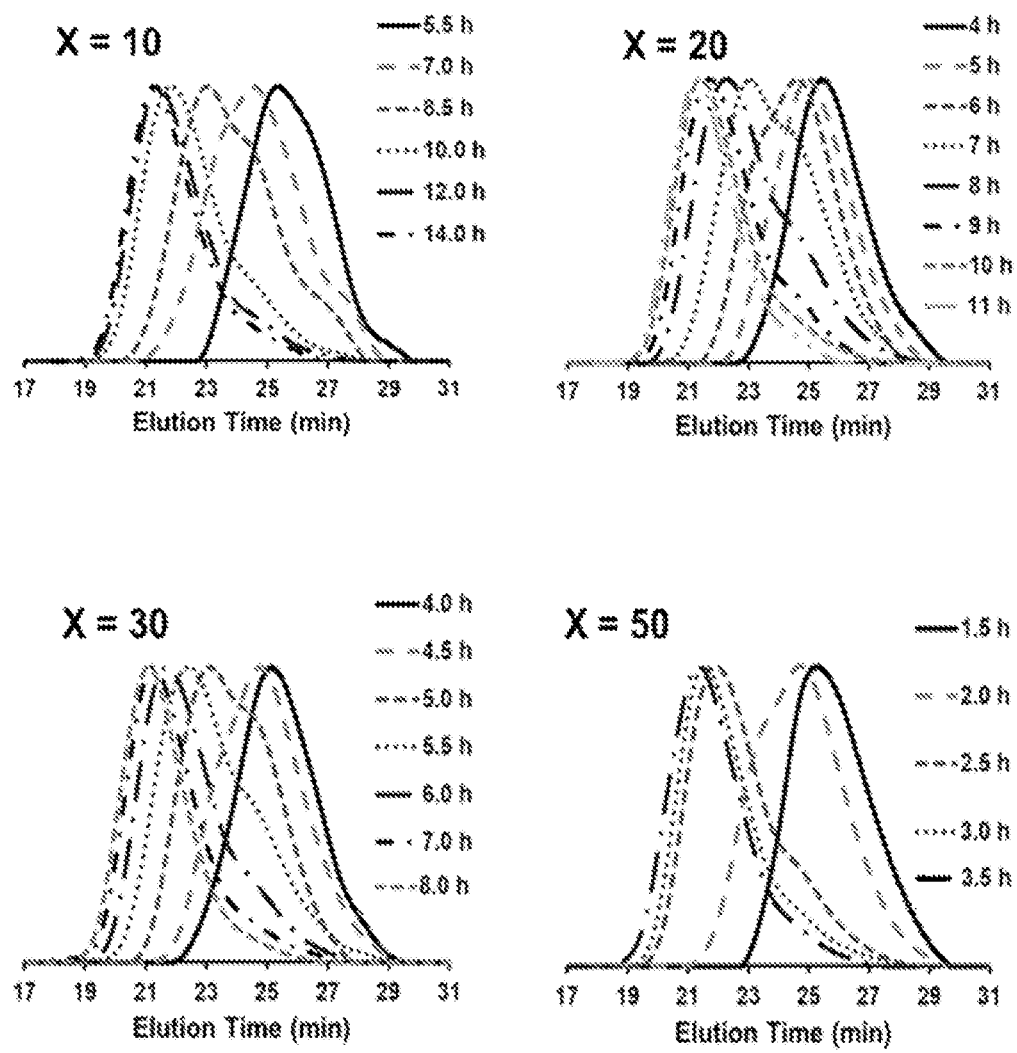
FIG. 2C shows the relation of the average molecular weight ($M_n$) of first intermediate versus time under different equivalent of radical initiator in accordance with the present invention.

In this embodiment, the reaction was performed with different equivalent (X=50, 30, 20, 10) of radical initiator (AIBN) and the molar ratio of mediator (Tralen), radical initiator (AIBN), and monomer of first polymer (VAc) is 1:X:1,000. The relation of monomer conversion of first intermediate versus time was shown in FIG. 2A. In FIG. 2A, monomer conversion shows the linear correlation versus time. The increase of AIBN led to the shorter induction period and higher polymerization rate. Reversely, the decrease of AIBN caused the longer induction period and reduced polymerization rate. FIG. 2B shows the relation of average molecular weight ($M_n$) and polymer dispersity index (PDI) of first intermediate versus the monomer conversion. In FIG. 2B, average molecular weight had linear correlation with monomer conversion and followed the theoretical molecular weight during the polymerization. In FIG. 2C, the larger average molecular weight ($M_n$) showed the shorter elution time and thus the average molecular weight ($M_n$) of first intermediate shifted to the higher values with the increase of time under the condition of varied molar ratio of radical initiator Embodiment 2

Mediator: radical initiator: the monomer of first polymer (VAc), where mediator is

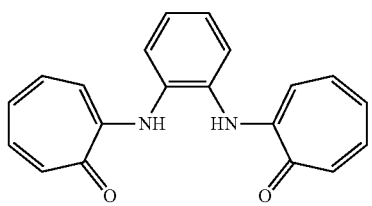 [SMILES: O=c1cccccc1Nc1ccccc1Nc1cccccc1=O]

Figure 3B:
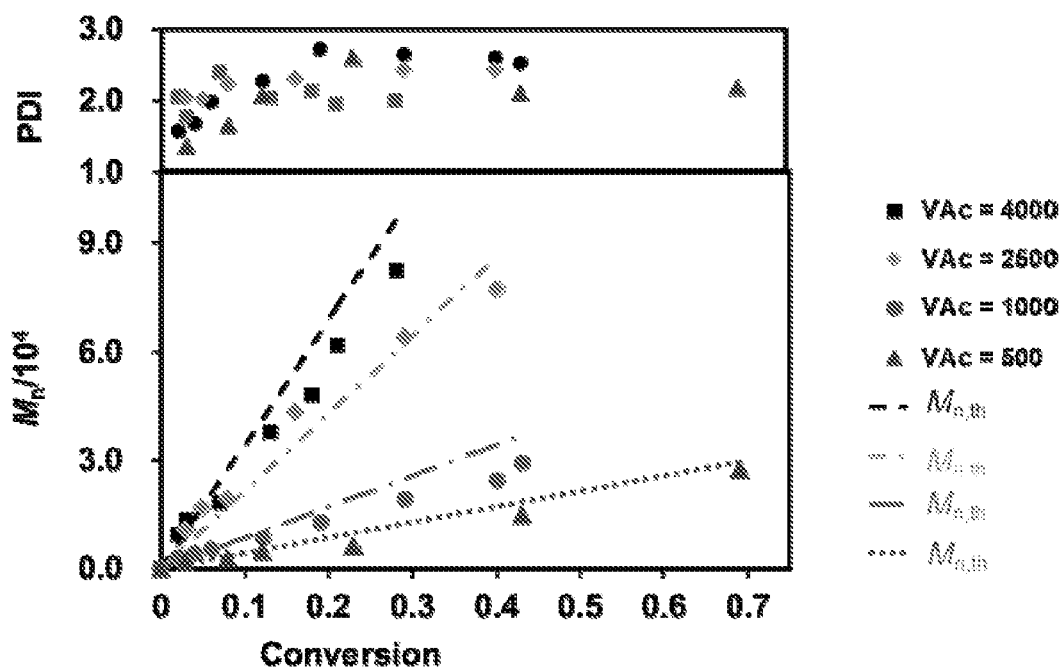
FIG. 3B shows the relation of the average molecular weight ($M_n$) and polymer dispersity index (PDI) versus monomer conversion in the formation of first intermediate by using Tralen as the mediator with different equivalent of monomer, where the monomer of first polymer is vinyl acetate (VAc) in accordance with the present invention.
Figure 3C:
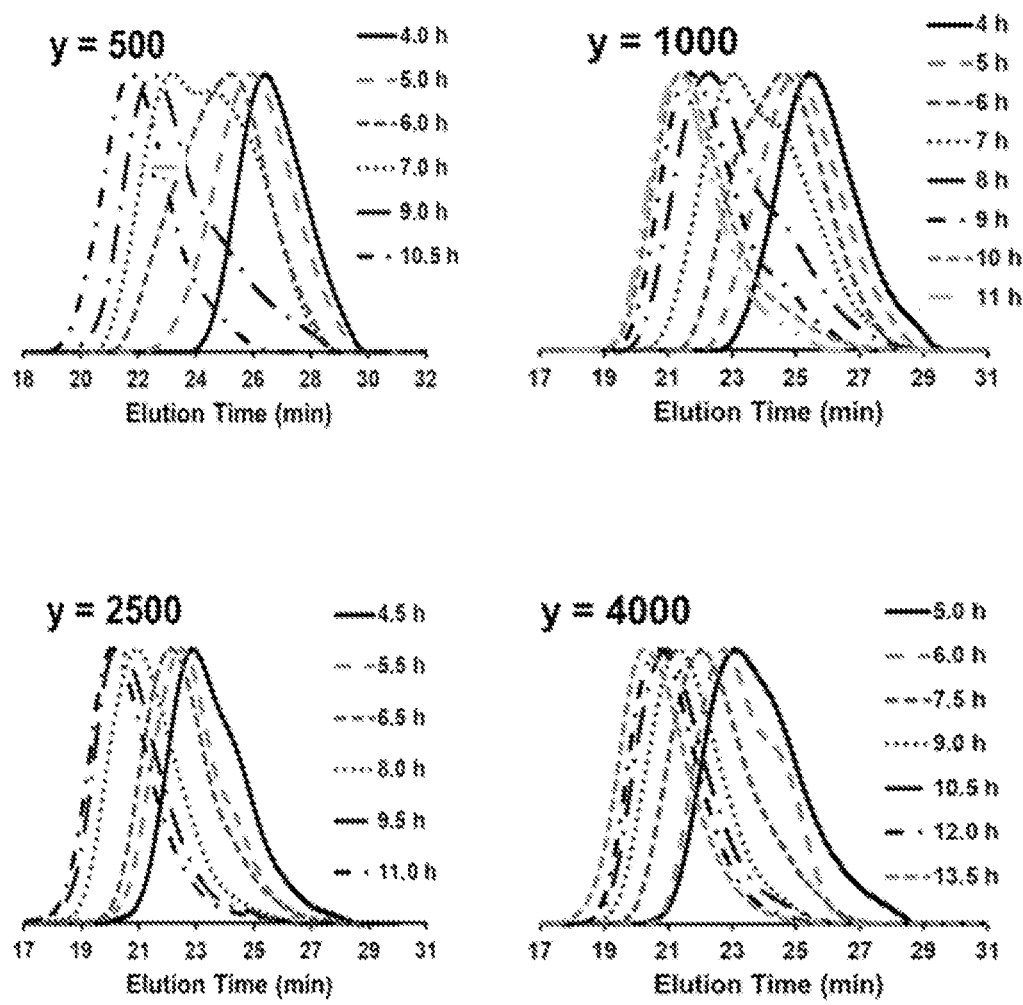
FIG. 3C shows the relation of the average molecular weight ($M_n$) of first intermediate versus time under different equivalent of monomer of first polymer in accordance with the present invention.

(Tralen) and radical initiator is AIBN. With the molar ratio of mediator (Tralen): radical initiator (AIBN): the monomer of first polymer (VAc) equal to 1:20:y, and the monomer concentration of first polymer (VAc) as 10.85 M, the polymerization was performed in bulk condition at 60° C. to generate PVAc (first intermediate (mediator-$P_1$'-X), described as Step S1). The reaction formula is the same as previous one. The difference between embodiment 2 and embodiment 1 is the amount of monomer of first polymer (VAc), which are 500, 1,000, 2,500, 4,000 equivalents, respectively. The relation of monomer conversion of first intermediate versus time is shown in FIG. 3A. The average molecular weight ($M_n$) and polymer dispersity index (PDI) of first intermediate versus monomer conversion is shown in FIG. 3B. In FIG. 3A, monomer conversion had a linear correlation with time and a consistent induction period. FIG. 3C shows that the average molecular weight ($M_n$) of first intermediate shifted to larger values. The average molecular weight ($M_n$) of first intermediate increased linearly with time under the condition of varied molar ratio of monomer.

Embodiment 3

Mediator: radical initiator: the monomer of first polymer (AN), where mediator is

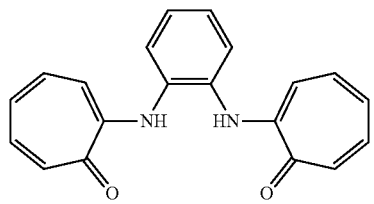 [SMILES: O=c1cccccc1Nc1ccccc1Nc1cccccc1=O]

(Tralen), radical initiator (X) is AIBN. In this embodiment, With the molar ratio of mediator (Tralen): radical initiator (AIBN): the monomer of first polymer (AN) equal to 1:10:1,000 and the concentration of AN as 5.08M, the polymerization performed in DMF (dimethylformamide) at 60° C. can generate PAN ((mediator-$P_1$'-X), described as Step S1). The reaction can be described as below:

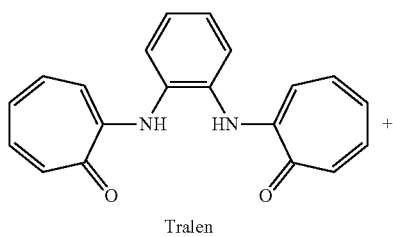

Embodiment 4

Mediator: radical initiator: the monomer of first polymer (NVP), where mediator is

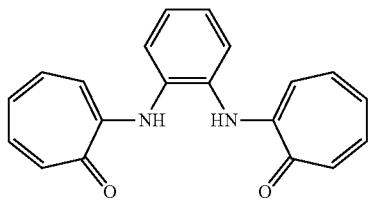 [SMILES: O=c1cccccc1Nc1ccccc1Nc1cccccc1=O]

(Tralen) and radical initiator (X) is AIBN. In this Embodiment, With the molar ratio of mediator (Tralen): radical initiator (AIBN): the monomer of first polymer (NVP) equal to 1:10:1,000 and the concentration of NVP as 9.36M, the polymerization performed in bulk at 60° C. can generate PNVP (first intermediate (mediator-$P_1$'-X), described as Step S1). The reaction can be described as below:

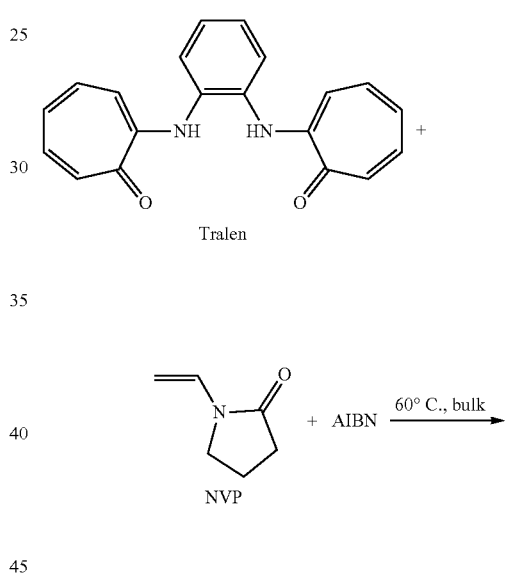

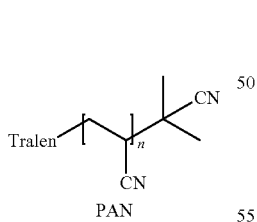

Figure 4A:
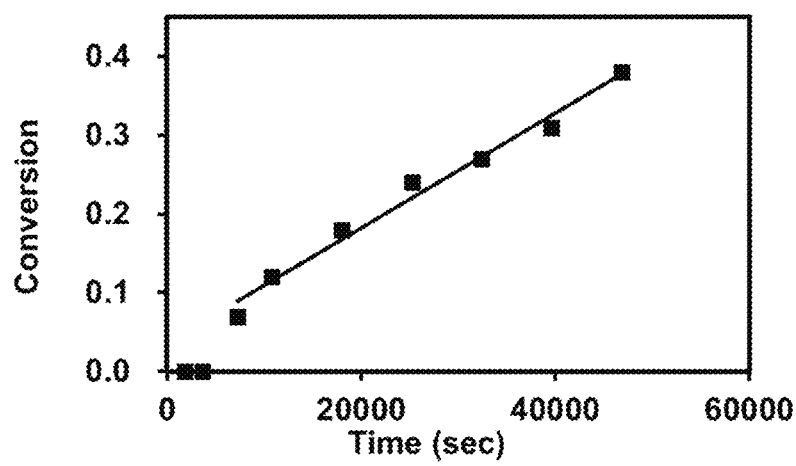
FIG. 4A shows the conversion of first intermediate versus time by using Tralen as the mediator, where the monomer of first polymer is acrylonitrile (AN) in accordance with the present invention.
Figure 4B:
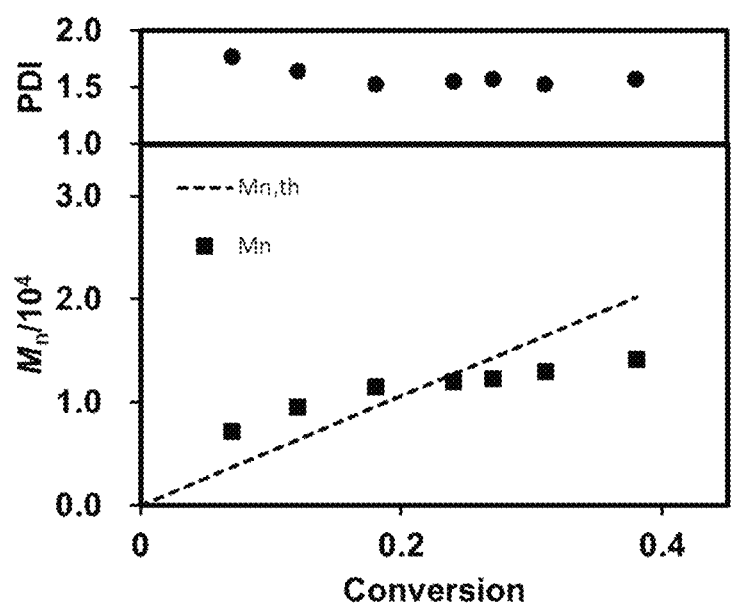
FIG. 4B shows the relation of the average molecular weight ($M_n$) and polymer dispersity index (PDI) of first intermediate versus monomer conversion by using Tralen as the mediator; where the monomer of first polymer is acrylonitrile (AN) in accordance with the present invention.

FIG. 4A shows the relation of monomer conversion of first intermediate versus time. FIG. 4B shows the relation of average molecular weight ($M_n$) and polymer dispersity index (PDI) of first intermediate versus monomer conversion. The linear correlation between the monomer conversion of first intermediate and time was observed in FIG. 4A. The average molecular weight of first intermediate had a linear correlation versus monomer conversion and matched the theoretical molecular weight in the present of mediator (Tralen), shown in FIG. 4B.

Figure 5A:
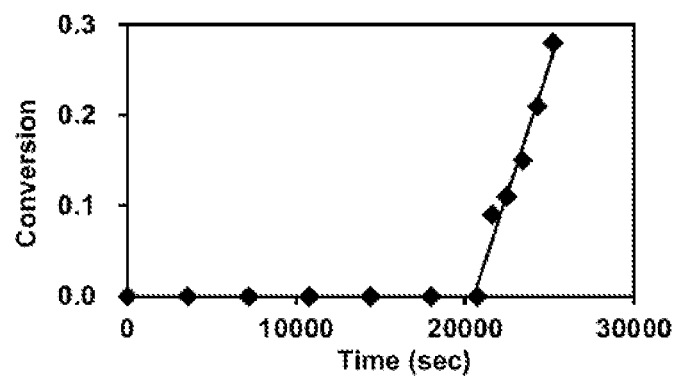
FIG. 5A shows the monomer conversion versus time in the formation of first intermediate by using Tralen as the mediator, where the monomer of first polymer is N-vinylpyrrolidone (NVP) in accordance with the present invention.
Figure 5B:
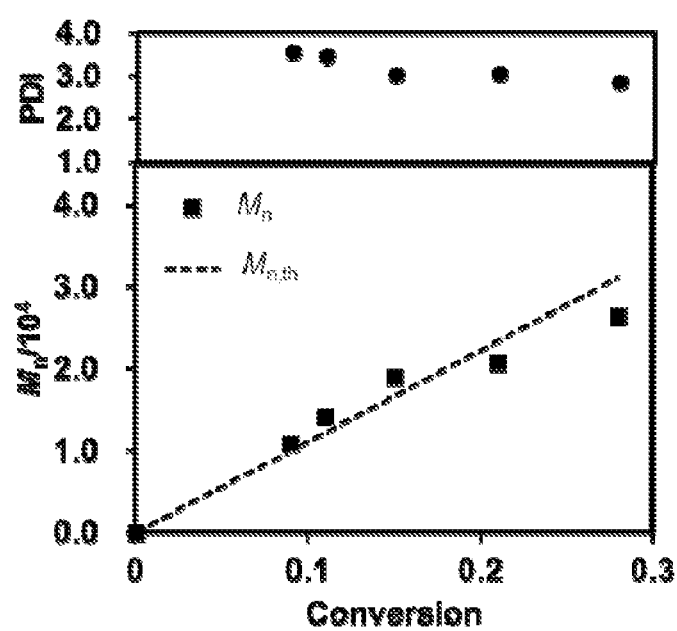
FIG. 5B shows the relation of the average molecular weight ($M_n$) and polymer dispersity index (PDI) of first intermediate versus monomer conversion using Tralen as the mediator, where the monomer of first polymer is N-vinylpyrrolidone (NVP) in accordance with the present invention.

FIG. 5A shows the relation of monomer conversion of first intermediate versus time. The relation of average molecular weight ($M_n$) and polymer dispersity index (PDI) of first intermediate versus monomer conversion is shown in FIG. 5B. FIG. 5A illustrates an obvious induction period, where the monomer conversion is close to zero. After the induction period, the monomer conversion raises rapidly and linearly with time. In FIG. 5B, the average molecular weight ($M_n$) of first intermediate grows linearly with the monomer conversion. Additionally, the average molecular weight ($M_n$) matches the theoretical value.

Embodiment 5

Mediator: radical initiator: the monomer of first polymer (VAc), where mediator is

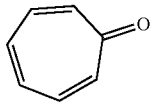

(Tropone) and radical initiator (X) is AIBN. With the molar ratio of mediator (Tropone), radical initiator (AIBN), and first polymer (VAc) equal to 1:X:1,000 and the polymerization performed in bulk condition at 60° C. can generate PVAc (first intermediate (mediator-$P_1'$-X), described as Step S1). The reaction can be described as below:

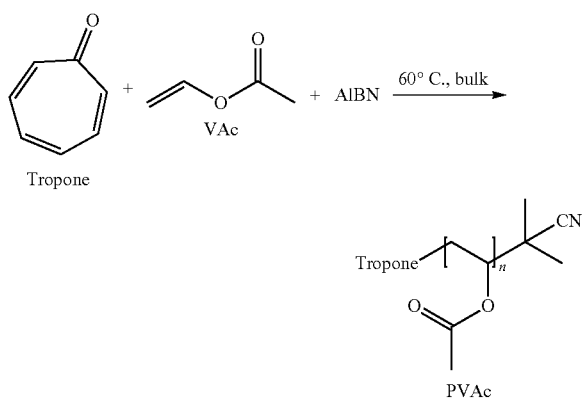

Figure 6A:
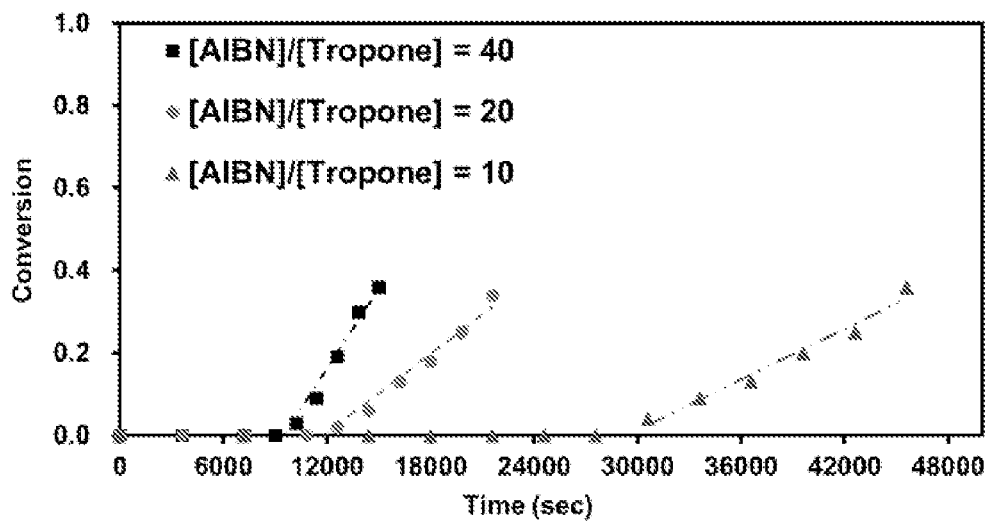
FIG. 6A shows the relation of monomer conversion of first intermediate versus time by using Tropone as the mediator, where the monomer is VAc, under different equivalent of radical initiator in accordance with the present invention.
Figure 6B:
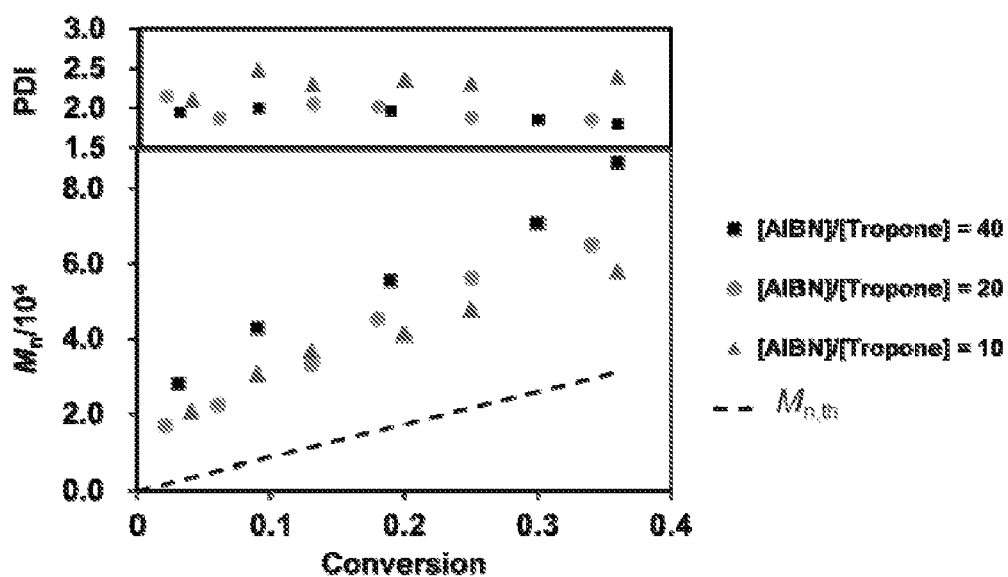
FIG. 6B shows the relation of the average molecular weight ($M_n$) and polymer dispersity index (PDI) of first intermediate versus monomer conversion using Tropone as the mediator, where the monomer of first polymer is VAc in accordance with the present invention.
Figure 6C:
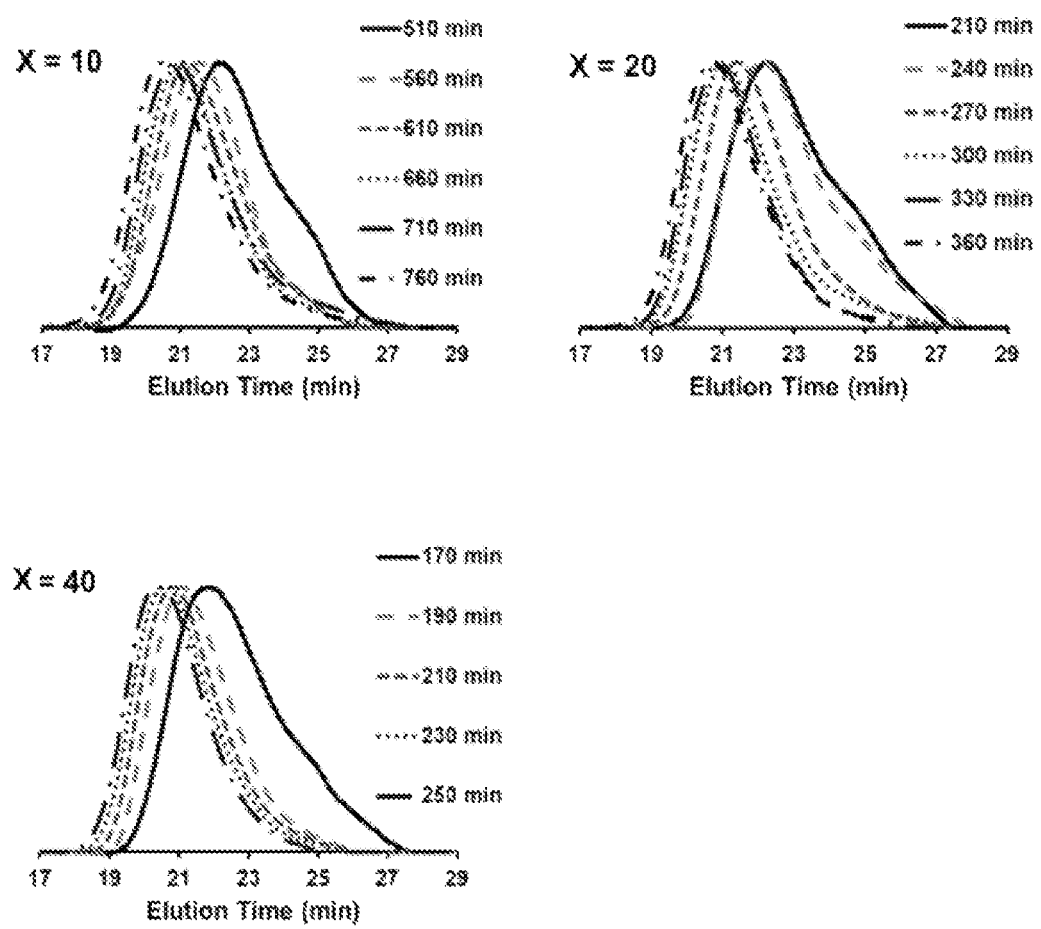
FIG. 6C shows the molecular weight of first intermediate versus time by using Tropone as mediator under different equivalent of radical initiator in accordance with the present invention.

The reaction is conducted with the molar ratio of mediator: radical initiator: the monomer of first polymer (VAc) equal to 1:X:1,000, where X is the equivalent (40, 20, 10) of radical initiator (AIBN) with a constant concentration of mediator (Tropone) and monomer of first polymer (VAc). The result is shown in FIG. 6A, which illustrates the relation of monomer conversion of first intermediate versus time. In FIG. 6A, monomer conversion grows linearly with time. The higher concentration of AIBN results in the shorter induction period and faster polymerization rate; the lower concentration of AIBN results in the longer induction period and lower polymerization rate. FIG. 6B shows the relation of average molecular weight ($M_n$) and the polymer dispersity index (PDI) of first intermediate versus monomer conversion. In FIG. 6B, although the average molecular weight deviates from the theoretical molecular weight during the polymerization, it still grows linearly with monomer conversion. FIG. 6C shows the increase of molecular weight versus time. The short elution time stands for the larger molecular weight. Accordingly, the average molecular weight ($M_n$) of first intermediate grows with time and the signal peaks shift to high molecular weight under the condition of varied molar ratio of radical initiator.

Embodiment 6

Mediator: radical initiator: the monomer of first polymer (VAc), where mediator is

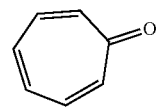

Figure 7A:
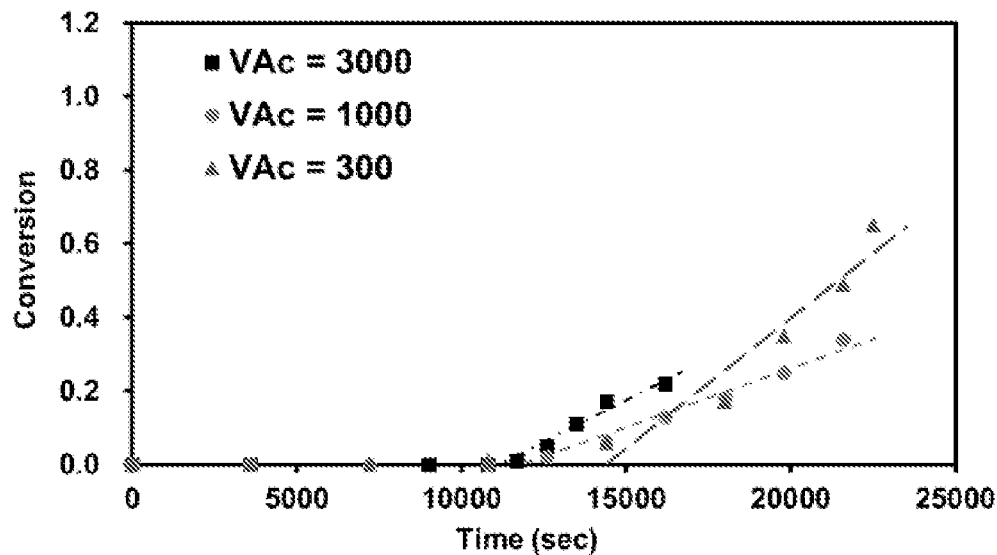
FIG. 7A shows the relation of monomer conversion of first intermediate versus time by using Tropone as the mediator under different equivalent of radical initiator, where the monomer of first polymer is VAc in accordance with the present invention.
Figure 7B:
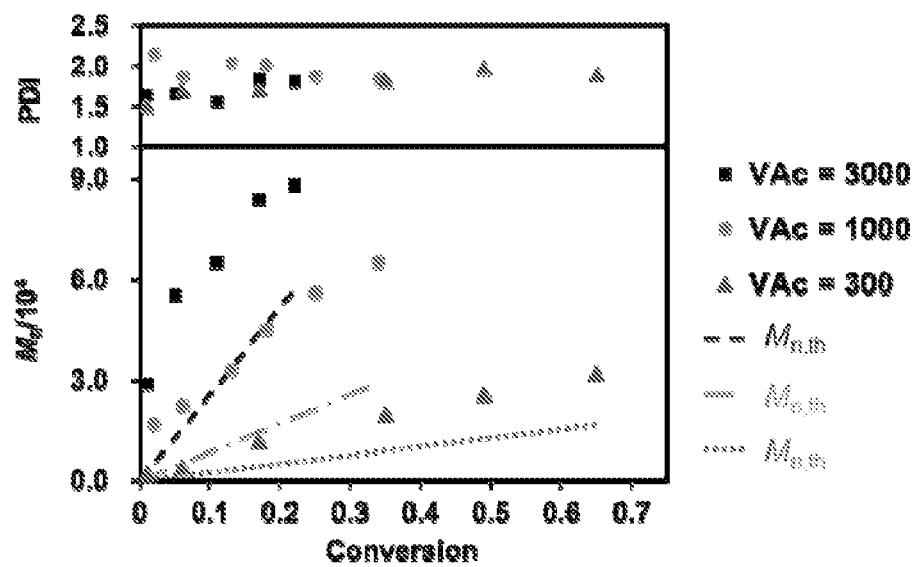
FIG. 7B shows the relation of the average molecular weight ($M_n$) and polymer dispersity index (PDI) of first intermediate versus monomer conversion using Tropone as the mediator under different equivalent of monomer; where the monomer of first polymer is VAc in accordance with the present invention.

(Tropone), radical initiator is AIBN. With the molar ratio of mediator (Tropone): radical initiator (AIBN): the monomer of first polymer (VAc) in 1:20:y, and the monomer concentration of first polymer (VAc) as 10.85M, the polymerization performed in bulk condition at 60° C. can generate PVAc (first intermediate (mediator-$P_1'$-X), described as Step S1). The reaction formula is the same as above. The difference is the equivalent of the monomer of first polymer (VAc), which are 300, 1,000, 3,000 equivalents, respectively. The relation of the monomer conversion of first intermediate versus time is shown in FIG. 7A. The relation of the average molecular weight ($M_n$) and the polymer dispersity index (PDI) of first intermediate versus the conversion is shown in FIG. 7B.

Figure 7C:
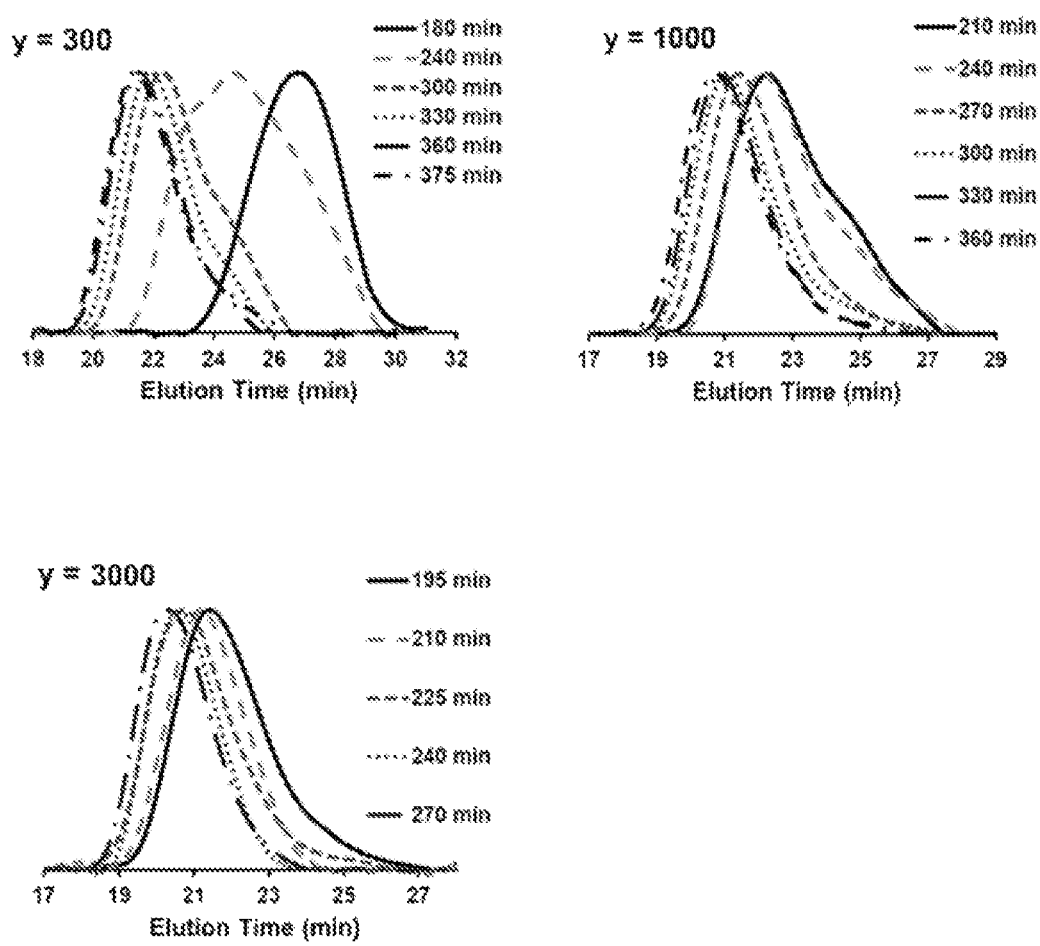
FIG. 7C shows the molecular weight of first intermediate versus time under different equivalent of monomer, where the monomer of first polymer is VAc in accordance with the present invention.

In FIG. 7A, linearly increased monomer conversion with time and the induction period were observed, similar to previous results. In FIG. 7B, although the average molecular weight deviates from the theoretical molecular weight, it still grows linearly with the monomer conversion. When the molar ratio of monomer increases, the molecular weight can reach almost 100,000; when the ratio is reduced, the monomer conversion can reach 65%. FIG. 7C shows the increase of molecular weight versus time. The short elution time stands for the larger molecular weight ($M_n$). Therefore, the average molecular weight ($M_n$) of first intermediate grows with time and the signal peaks shift to high molecular weight under the condition of varied molar ratios of monomer equivalent.

Embodiment 7

Mediator: radical initiator: the monomer of first polymer (MA), where the mediator is

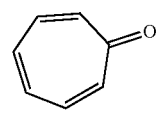

(Tropone) and radical initiator (X) is AIBN. In this embodiment, With the molar ratio of mediator (Tropone): radical initiator (AIBN): the monomer of first polymer (MA) equal to 1:20:1,000, and the concentration of MA as 5.42M, the polymerization performed in benzene at 50° C. can generate PMA ((mediator-$P_1'$-X), as described in Step S1). The reaction can be described as below:

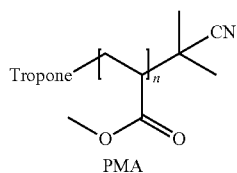

Figure 8A:
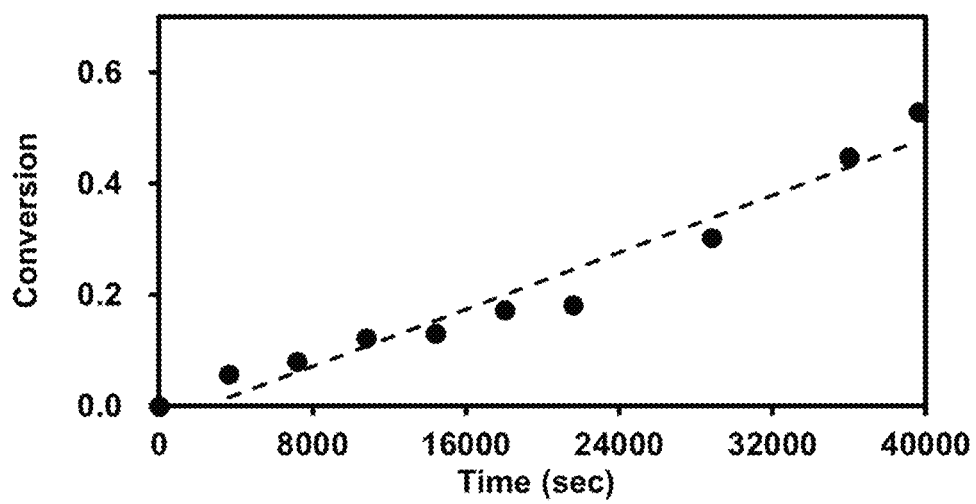
FIG. 8A shows the relation of monomer conversion of first intermediate versus time using Tropone as the mediator, where the monomer of first polymer is methyl acrylate (MA) in accordance with the present invention.
Figure 8B:
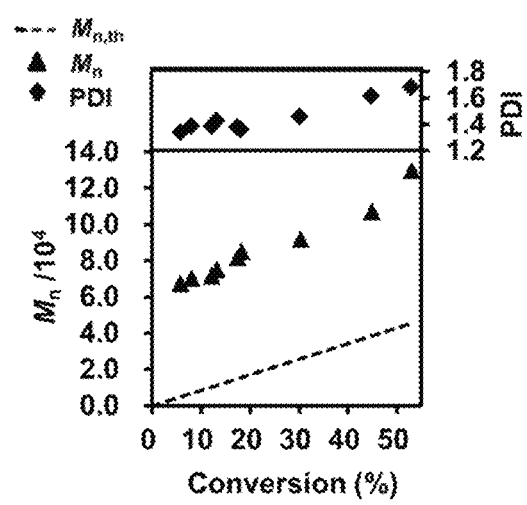
FIG. 8B shows the relation of average molecular weight ($M_n$) and polymer dispersity index (PDI) of first intermediate versus monomer conversion under different equivalent of monomer using Tropone as the mediator, where the monomer of first polymer is methyl acrylate (MA) in accordance with the present invention.
Figure 8C:
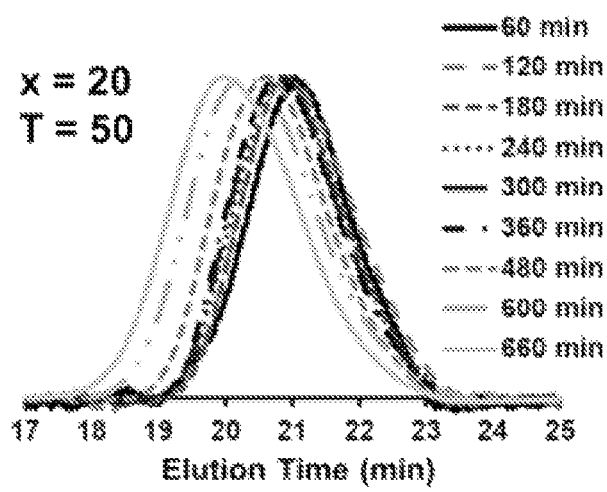
FIG. 8C shows the molecular weight of first intermediate versus time, where the monomer of first polymer is methyl acrylate (MA) in accordance with the present invention.

FIG. 8A shows the relation of monomer conversion of first intermediate versus time. The relation of the average molecular weight ($M_n$) and polymer dispersity index (PDI) of first intermediate versus monomer conversion is shown in FIG. 8B. In FIG. 8A, the monomer conversion of first intermediate increases linearly with time. In FIG. 8B, with the mediator (Tropone), although the average molecular weight of first intermediate deviates from the theoretical molecular weight, it increases linearly with the monomer conversion. FIG. 8C shows the increase of molecular weight versus time. The short elution time stands for the larger molecular weight ($M_n$). Therefore, the average molecular weight ($M_n$) of first intermediate grows with time and the signal peaks shift to high molecular weight under the condition of varied molar ratios of monomer equivalent.

Embodiment 8

Mediator: radical initiator: the monomer of first polymer (VAc), where mediator is

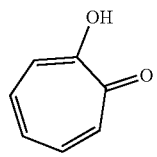

(Tropolone), radical initiator (X) is AIBN. With the molar ratio of mediator (Tropolone), radical initiator (AIBN), and monomer of first polymer (VAc) equal to 1:X:1,000, the polymerization performed in bulk at 60° C. can generate PVAc (first intermediate (mediator-$P_1$'-X), as described in Step S1). The reaction can be described as below:

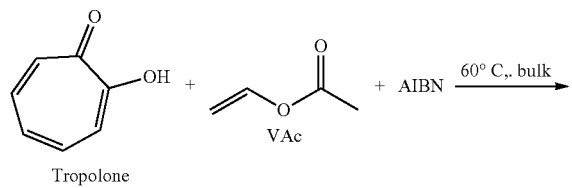

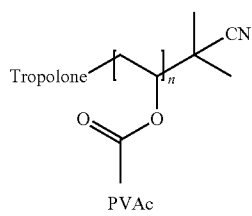

Figure 9A:
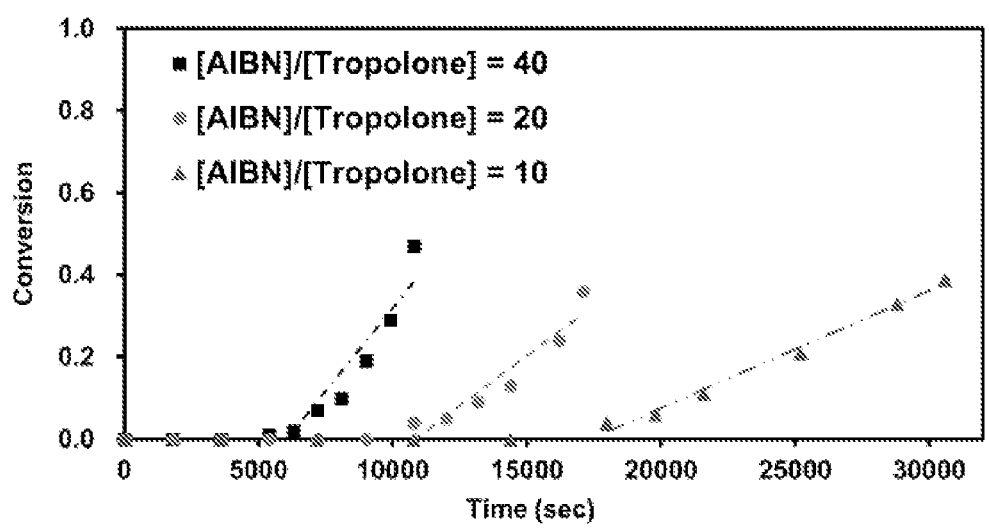
FIG. 9A shows the relation of monomer conversion of first intermediate versus time using Tropolone as the mediator under different equivalent of radical initiator, where the monomer of first polymer is VAc in accordance with the present invention.
Figure 9B:
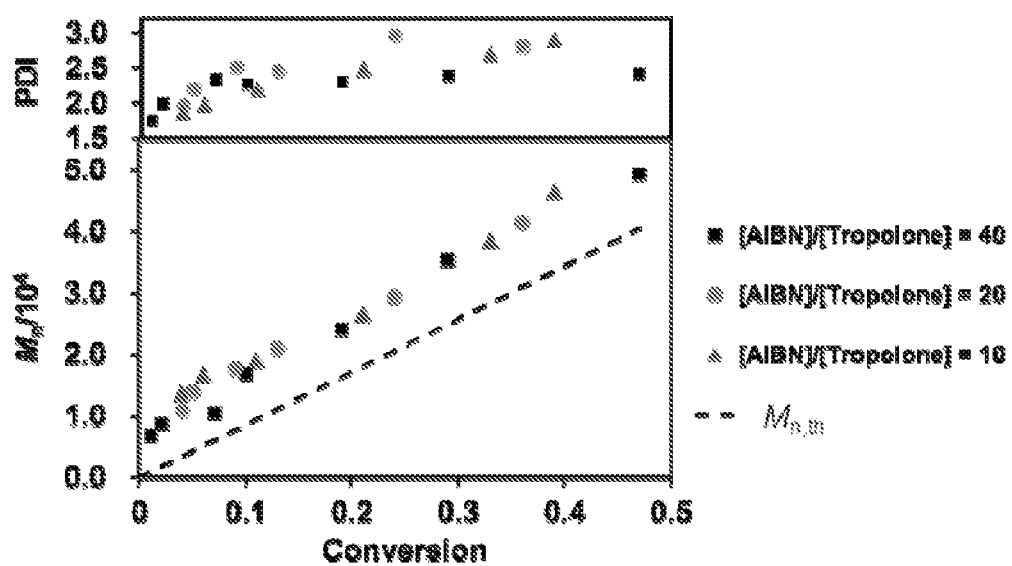
FIG. 9B shows the relation of average molecular weight (Ma) and polymer dispersity index (PDI) of first intermediate versus monomer conversion using Tropolone as the mediator, where the monomer of first polymer is VAc in accordance with the present invention.
Figure 9C:
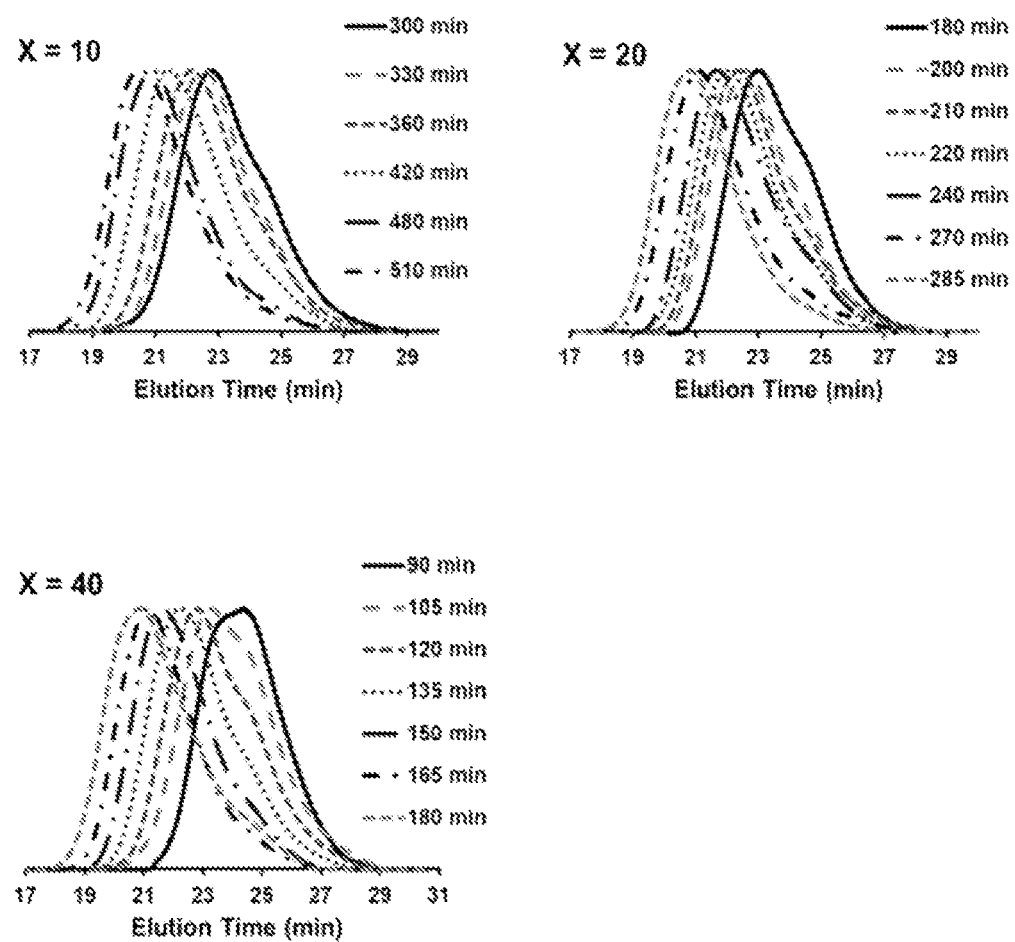
FIG. 9C shows the molecular weight of first intermediate versus time using Tropolone as the mediator under different equivalent of radical initiator, where the monomer of first polymer is VAc in accordance with the present invention.

With the fixed concentrations of mediator (Tropolone) and monomer of first polymer (VAc), the polymerization performed under the condition of mediator: radical initiator: the monomer of first polymer (VAc) equal to 1:X:1,000 and varied equivalent of radical initiators (AIBN) (40, 20, 10) can generate the first intermediate. The relation of the monomer conversion of first intermediate versus time is shown in FIG. 9A. In FIG. 9A, the monomer conversion grows linearly with time. Raising the molar ratio of AIBN shortens the induction period and increases the polymerization rate. Lowering the molar ratio of AIBN increases induction period and decreases the polymerization rate. FIG. 9B shows the relation of average molecular weight ($M_n$) and polymer dispersity index (PDI) of first intermediate versus monomer conversion. In FIG. 9B, although the average molecular weight deviates from the theoretical molecular weight during the polymerization, it still grows linearly with monomer conversion. FIG. 9C shows the increase of molecular weight versus time. The shorter elution time stands for the larger average molecular weight ($M_n$). Therefore, the average molecular weight ($M_n$) of first intermediate grows with time and the signal peaks shift to high molecular weight under the condition of varied molar ratios of monomer equivalent.

Embodiment 9

Mediator: radical initiator: the monomer of first polymer (VAc), where mediator is

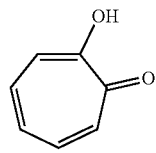

Figure 10A:
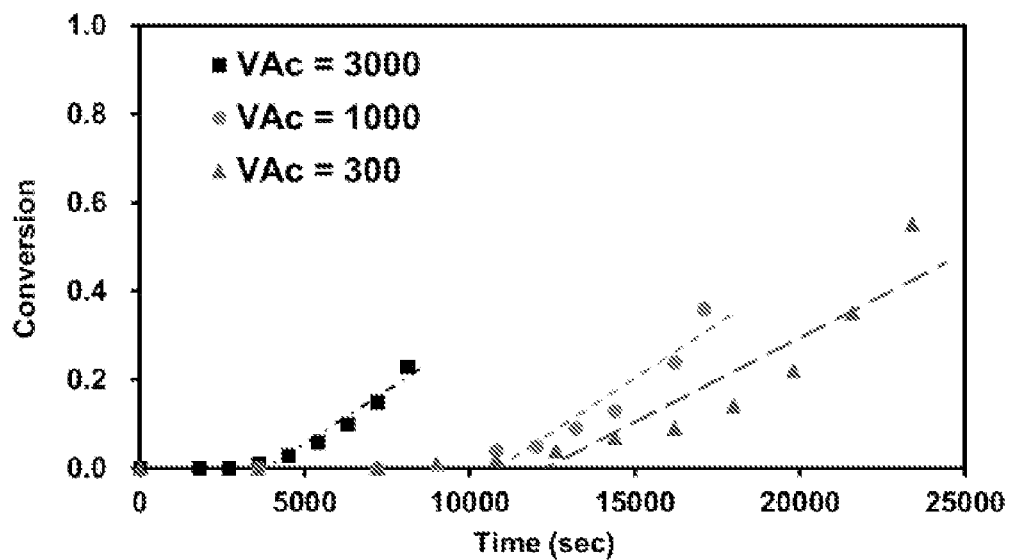
FIG. 10A shows the relation of monomer conversion of first intermediate versus time using Tropolone as the mediator under different equivalent of monomer, where the monomer of first polymer is VAc in accordance with the present invention.
Figure 10B:
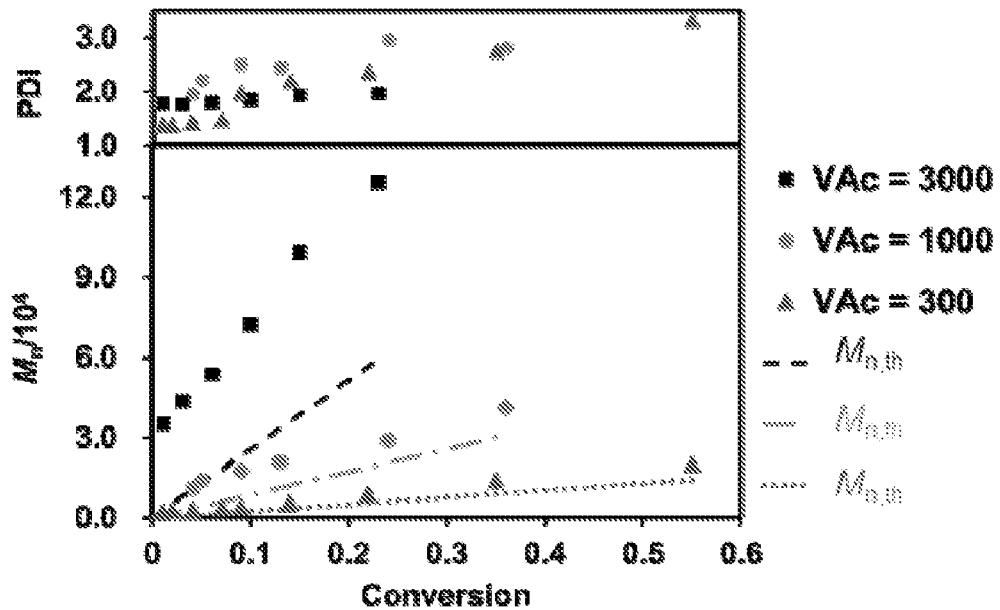
FIG. 10B shows the relation of average molecular weight ($M_n$) and polymer dispersity index (PDI) of first intermediate versus monomer conversion using Tropolone as the mediator under different equivalent of monomer, where the monomer of first polymer is VAc in accordance with the present invention.
Figure 10C:
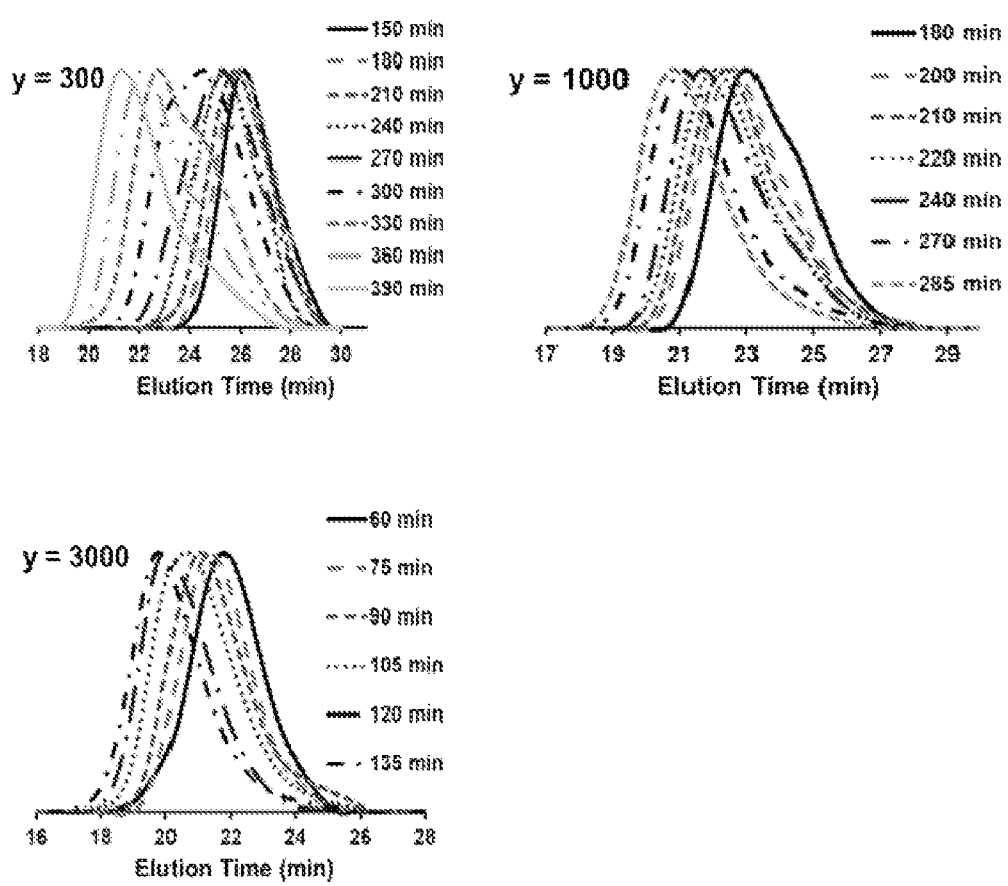
FIG. 10C shows the molecular weight of first intermediate versus time using Tropolone as the mediator under different equivalent of monomer, where the monomer of first polymer is VAc in accordance with the present invention.

(Tropolone) and radical initiator is AIBN. With the molar ratio of mediator (Tropolone): radical initiator (AIBN): the monomer of first polymer (VAc) equal to 1:20:y, and the concentration of monomer of first polymer (VAc) as 10.85M, the polymerization performed in bulk at 60° C. can generate PVAc (first intermediate (mediator-$P_1$'-X), as described in Step S1). The reaction formula is the same as that of embodiment 8 but the equivalent of monomer of first polymer (VAc) is changed in embodiment 9 to 300, 1,000, and 3,000, respectively. The relation of monomer conversion of first intermediate versus time is shown in FIG. 10A. The relation of average molecular weight ($M_n$) and polymer dispersity index (PDI) of first intermediate versus conversion is shown in FIG. 10B. In FIG. 10A, monomer conversion had a liner correlation with time. In FIG. 10B, average molecular weight had a linear correlation with monomer conversion though the deviation from theoretical molecular weight occurred. The molecular weight could reach 120,000 when the higher monomer ratio is applied. The monomer conversion could reach 55% when the lower ratio of monomer is applied. FIG. 10C shows the increase of molecular weight versus time. The shorter elution time stands for the larger average molecular weight (Me). Therefore, the average molecular weight ($M_n$) of first intermediate grows with time and the signal peaks shift to high molecular weight under the condition of varied molar ratios of monomer equivalent.

Embodiment 10

Mediator: radical initiator: the monomer of first polymer (NVP), where mediator is

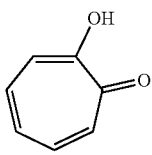

(Tropolone), radical initiator (X) is VA-044. In this embodiment, With the molar ratio of mediator (Tropolone): radical initiator (VA-044): the monomer of first polymer (NVP) equal to 1:20:1,000, and the concentration of NVP as 4.68M, the polymerization performed in distilled water at 40° C. can generate PNVP (first intermediate (mediator-$P_1'$-X), as described in Step S1). The reaction can be described as below:

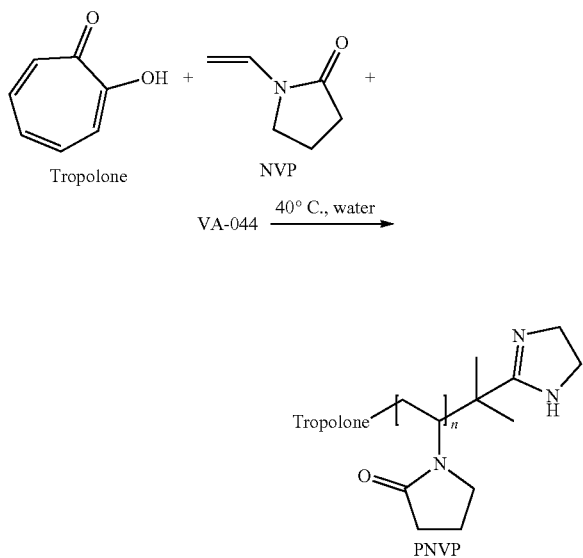

Figure 11A:
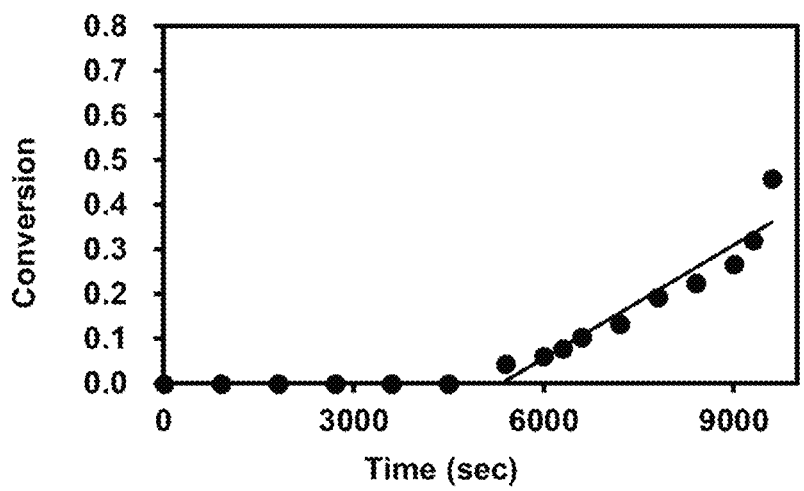
FIG. 11A shows the relation of monomer conversion of first intermediate versus time using 2,2'-Azobis[2-(2-imidazolin-2-yl)propane]dihydrochloride (as known as VA-044) as the initiator and Tropolone as the mediator, where the monomer of first polymer is N-vinylpyrrolidone (NVP) in accordance with the present invention.
Figure 11B:
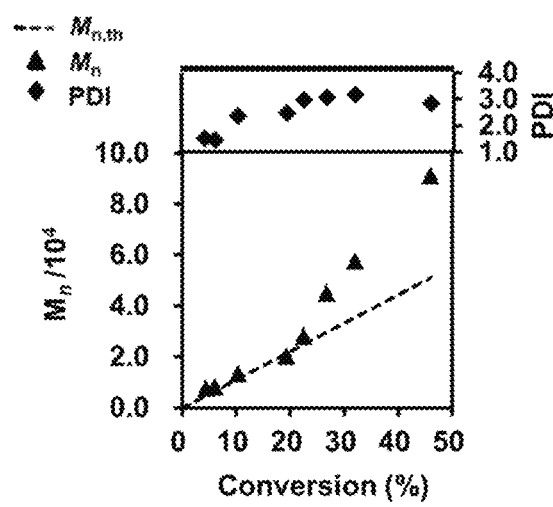
FIG. 11B shows the relation of average molecular weight ($M_n$) and polymer dispersity index (PDI) of first intermediate versus monomer conversion using 2,2'-Azobis[2-(2-imidazolin-2-yl)propane]dihydrochloride (as known as VA-044) as the initiator and Tropolone as the mediator, where the monomer of first polymer is N-vinylpyrrolidone (NVP) in accordance with the present invention.
Figure 11C:
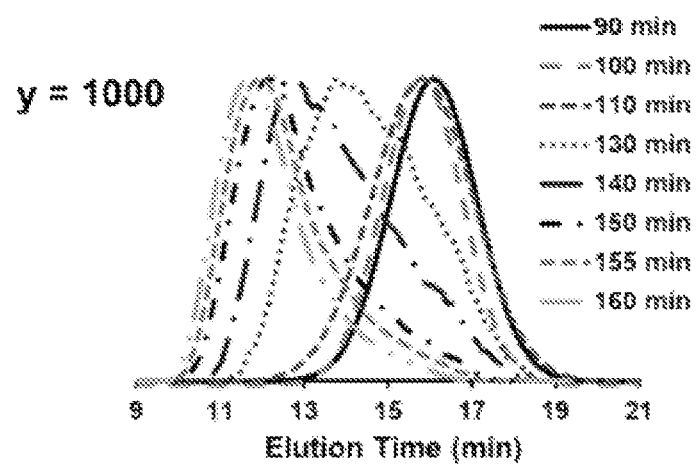
FIG. 11C shows the molecular weight of first intermediate versus time using 2,2'-Azobis[2-(2-imidazolin-2-yl)propane]dihydrochloride (as known as VA-044) as the initiator and Tropolone as the mediator, where the monomer of first polymer is N-vinylpyrrolidone (NVP) in accordance with the present invention.

The relation of monomer conversion of first intermediate versus time is shown in FIG. 11A. The relation of average molecular weight ($M_n$) and polymer dispersity index (PDI) of first intermediate versus conversion is shown in FIG. 11B. There is an induction period, in which the monomer conversion does not increase significantly, before the formation of the first intermediate. After the induction period, the monomer conversion grows rapidly and linearly with time. In FIG. 11B, when the monomer conversion of first intermediate increases, the average molecular weight also increases. At high monomer conversion, the deviation of average molecular weight ($M_n$) from the theoretical value was observed. FIG. 11C shows the increase of molecular weight versus time. The shorter elution time stands for the larger average molecular weight ($M_n$). Therefore, the average molecular weight ($M_n$) of first intermediate grows with time and the signal peaks shift to high molecular weight under the condition with varied molar ratios of monomer equivalent.

Embodiment 11

Mediator: radical initiator: the monomer of first polymer (VAc), where the mediator is

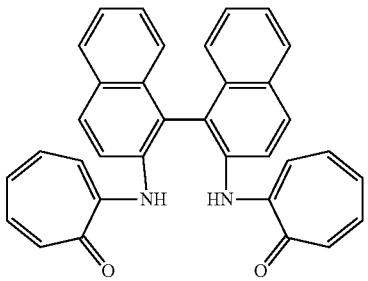 [SMILES: O=c1cccccc1Nc1ccc2ccccc2c1-c1c(Nc2cccccc2=O)ccc2ccccc12]

(Binam-Tralen) and radical initiator (X) is AIBN. With the molar ratio of mediator (Binam-Tralen): radical initiator (AIBN): the monomer of first polymer (VAc) equal to 1:X:1000, and the monomer concentration of the first polymer (VAc) as 10.85M, the polymerization performed in bulk at 60° C. with varied equivalent of radical initiator (AIBN), which are 40, 20, and 10, respectively, can generate the first intermediate (mediator-$P_1'$-X, described as Step S1).

Figure 12A:
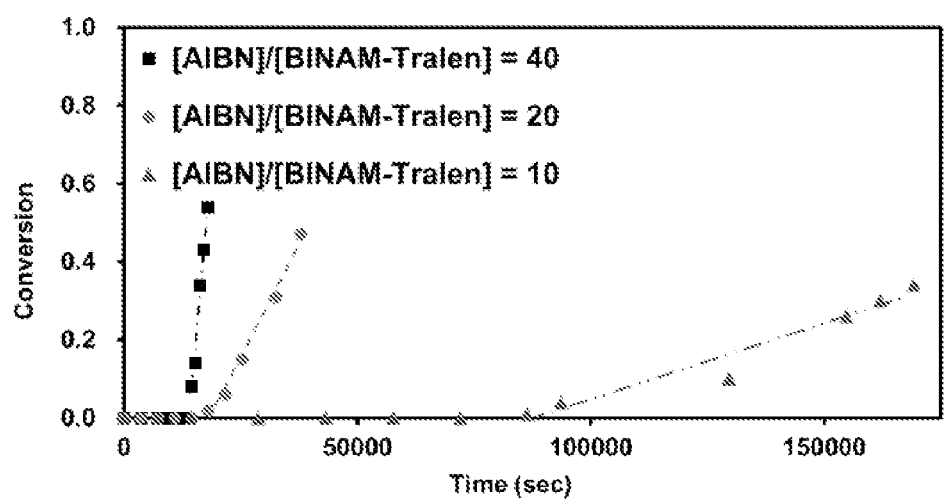
FIG. 12A shows the relation of monomer conversion of first intermediate versus time using Binam-Tralen as the mediator under difference equivalent of radical initiator, where the monomer of first polymer is VAc in accordance with the present invention.
Figure 12B:
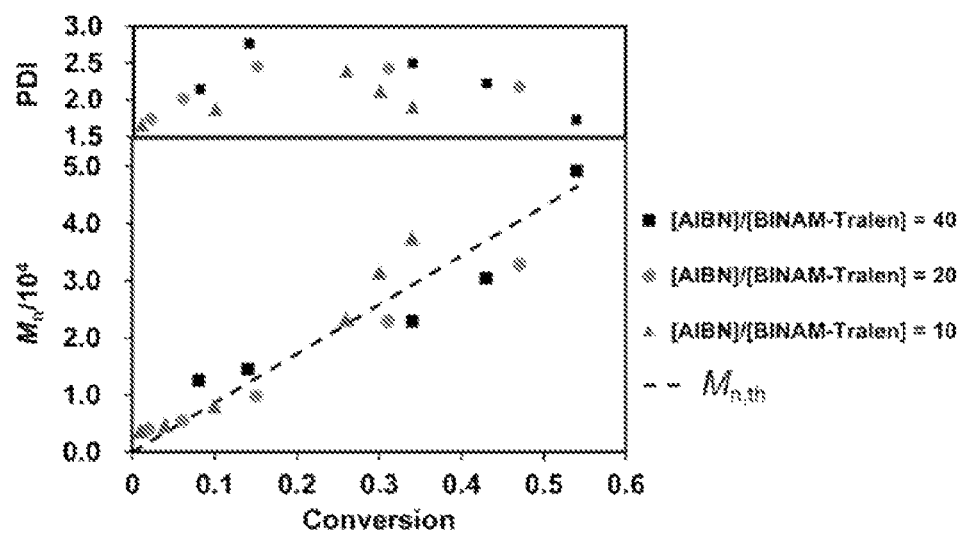
FIG. 12B shows the relation of average molecular weight ($M_n$) and polymer dispersity index (PDI) of first intermediate versus monomer conversion using Binam-Tralen as the mediator under difference equivalent of radical initiator, where the monomer of first polymer is VAc in accordance with the present invention.

FIG. 12A shows the relation of the monomer conversion of first intermediate versus time. The relation of average molecular weight ($M_n$) and polymer dispersity index (PDI) of the first intermediate versus conversion is shown in FIG. 12B. In FIG. 12A, monomer conversion shows a linear correlation with time. Raising the concentration of AIBN results in a decrease of induction period and an increase of polymerization rate. In FIG. 12B, the average molecular weight ($M_n$) of first intermediate had a linear correlation with the monomer conversion and matched the theoretical value regardless of the molar ratio of radical initiator.

In this invention, monomer conversion means the molar ratio between the monomer of first polymer converted to the first intermediate by polymerization and the unreacted monomer, which is determined by $^1$H NMR spectroscopy; the average molecular weight ($M_n$) is determined by GPC (gel permeation chromatography). The standard used in GPC is polystyrene. Theoretical molecular weight can be calculated by the following formula:

$$M_{n,th} = ([\text{monomer}]_0 / [\text{mediator}]_0) \times (M.W. \text{ of monomer}) \times \text{Conversion}$$

$M_{n,th}$ is the theoretical molecular weight, $[\text{monomer}]_0$ is the initial concentration of monomer of first polymer, $[\text{mediator}]_0$ is the initial concentration of mediator, M.W. of monomer is the molecular weight of monomer, and Conversion is the monomer conversion of the monomer of first polymer.

Then, the block copolymer (mediator-$P_2$-$P_1$-X or mediator-$P_2'$-$P_1$-X) can be obtained by mixing the first intermediate (mediator-$P_1'$-X) and the monomer of second polymer (as shown in Step S2), followed by the hydrolysis. For example, with embodiment 1, the second intermediate can be formed by mixing the first intermediate (PVAc, generated from embodiment 1) and the monomer of second polymer (MA). The second intermediate is the block copolymer of VAc and MA with average molecular weight ($M_n$) of 28,000 and the polymer dispersity index of 2.22. The reaction can be described as below:

After the hydrolysis of the second intermediate, block copolymer of PVA-b-PAA can be obtained.

As mentioned above, this invention shows that the catalyst and the mediator for the polymerization are not only metal-free (without transition metal or heavy metal) but also sulfur-free compound. Therefore, the mediator has lower bio-toxicity and limited pollution to the environment. Besides, by using specific conjugated seven-membered ring as the mediator, it can generate eco-friendly block copolymer with predetermined molecular weight. In this embodiment, the average molecular weight of block copolymer can be controlled according to the need in the range of 2,000~120,000 or 1,000~200,000. The properties of block copolymer are more suitable for the applications in the fields of surfactant, pigment dispersant, emulsifier, and biomaterials such as drug delivery. Therefore, the block copolymers developed by this invention can be applied to adhesive, stabilizer, dispersant, emulsifier, photographic emulsion, and filler etc.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A preparation method of block copolymer comprising:
    forming a first intermediate by mixing a before-hydrolysis-monomer of a first polymer ($P_1'$), a radical initiator, and a mediator with a molar ratio of 1,000:20:1, and a structure of the first intermediate is shown as mediator-$P_1'$-X, formula (1), wherein X is an end-functional group of the first intermediate;
    forming a second intermediate by mixing the first intermediate and a before-hydrolysis-monomer of a second polymer ($P_2'$), wherein a structure of the second intermediate is mediator-$P_2'$-$P_1'$-X, formula (2);
    generating a block copolymer by hydrolysis of the second intermediate, a formula of the block copolymer is described as mediator-$P_2$-$P_1$-X, formula (3) or mediator-$P_2'$-$P_1$-X, formula (4), wherein a second polymer ($P_2$) in formula (3) is a hydrolyzed product of the second polymer ($P_2'$), the second polymer ($P_2'$) in formula (4) is the product not been hydrolyzed, a structure is shown as

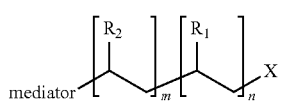

formula (5), wherein $R_1$ is a functional group of a first polymer ($P_1$), $R_2$ is a functional group of the second polymer ($P_2$), n is an amount of monomer on the first polymer ($P_1$), and is an integer, m is an amount of monomer on the second polymer ($P_2$), and is an integer; n and m are between 10-1,500, and from formula (1) to formula (5), the mediator is a conjugated seven-membered ring structure, the end-functional group (X) of the first intermediate, the second intermediate, and the block copolymer is the same.

2. The preparation method of block copolymer according to claim 1, wherein the radical initiator is aqueous initiator or organic initiator.

3. The preparation method of block copolymer according to claim 2, wherein the aqueous initiator is

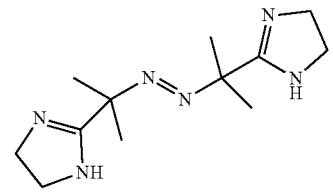 [SMILES: CC(C)(/N=N/C(C)(C)C1=NCCN1)C1=NCCN1]

(2,2'-Azobis[2-(2-imidazolin-2-yl)propane]dihydrochloride) or

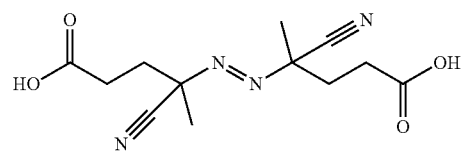 [SMILES: CC(C#N)(CCC(=O)O)/N=N/C(C)(C#N)CCC(=O)O]

(4,4'-Azobis(4-cyanopentanoic acid).

4. The preparation method of block copolymer according to claim 2, wherein the organic initiator is

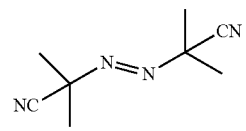

(2,2'-Azobis(2-methylpropionitrile, AIBN),

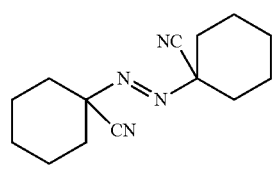 [SMILES: N#CC1(/N=N/C2(C#N)CCCCC2)CCCCC1]

(1,1'-Azobis(cyanocyclohexane), ABCN),

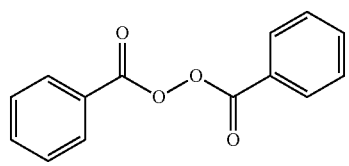 [SMILES: O=C(OOC(=O)c1ccccc1)c1ccccc1]

(diphenylperoxyanhydride, BPO), or

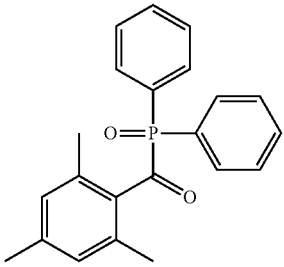 [SMILES: Cc1cc(C)c(C(=O)P(=O)(c2ccccc2)c2ccccc2)c(C)c1]

(diphenyl(2,4,6-trimethylbenzoyl)phosphine oxide, TPO).

5. The preparation method of block copolymer according to claim 1, wherein the molar ratio of the radical initiator and the mediator (radical initiator/mediator) is 0.5-50.

6. The preparation method of block copolymer according to claim 1, wherein the monomer of the first polymer and the second polymer is conjugated olefin.

7. The preparation method of block copolymer according to claim 1, wherein the monomer of the first polymer and the second polymer is

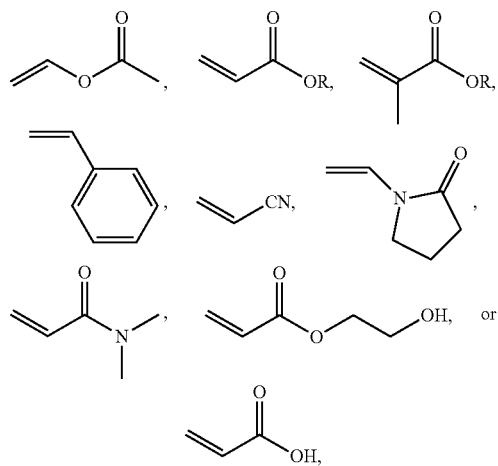

where R=alkyl($C_1$~$C_{10}$) in

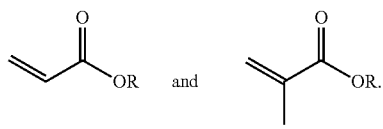

8. The preparation method of block copolymer according to claim 1, wherein a structure of the mediator is shown as below:

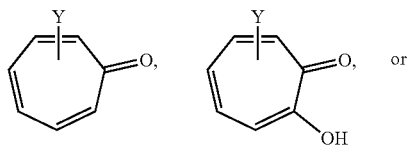

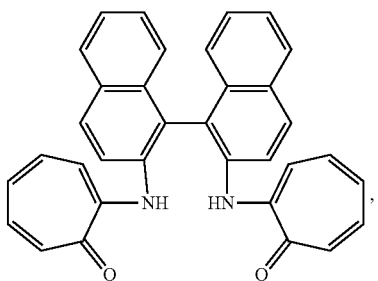

where Y is halide, OR, $NR_2$, alkyl($C_1$~$C_{20}$), cycloalkane, aromatic ring or arene, where R is hydrogen, alkyl($C_1$~$C_{20}$), cycloalkane, aromatic ring or arene.

9. The preparation method of block copolymer according to claim 1, wherein a structure of the mediator is described as

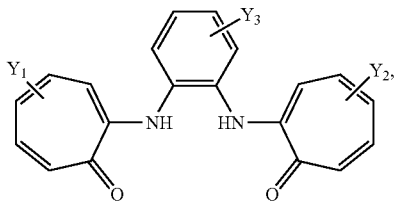

where $Y_1$, $Y_2$ and $Y_3$ is halide, hydrogen, OR, $NR_2$, alkyl ($C_1$~$C_{20}$), cycloalkane, aromatic ring or arene; where R is hydrogen, alkyl($C_1$~$C_{20}$), cycloalkane, aromatic ring or arene and $Y_1$, $Y_2$ and $Y_3$ is the same or different.

10. The preparation method of block copolymer according to claim 1, wherein the end-functional group (X) is

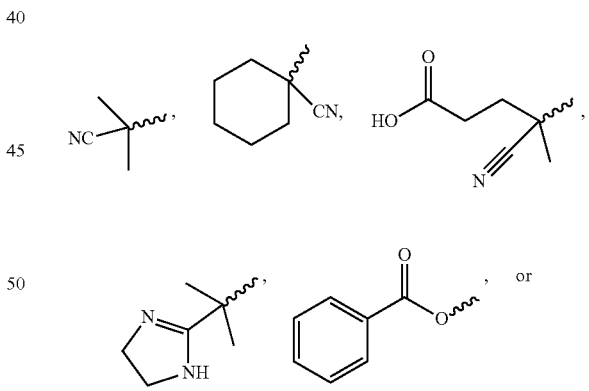

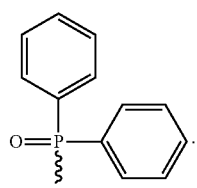

* * * * *